(12) United States Patent
Minami

(10) Patent No.: US 6,741,386 B2
(45) Date of Patent: May 25, 2004

(54) DISPLAY ELEMENT AND PROCESS FOR ITS MANUFACTURE

(75) Inventor: Masato Minami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/207,219

(22) Filed: Jul. 30, 2002

(65) Prior Publication Data

US 2003/0030884 A1 Feb. 13, 2003

(30) Foreign Application Priority Data

Aug. 1, 2001 (JP) .................................... 2001/233251
Jul. 15, 2002 (JP) .................................... 2002/205976

(51) Int. Cl.⁷ .............................................. G02B 26/00
(52) U.S. Cl. ....................................... 359/296; 359/243
(58) Field of Search ................................. 359/296, 240, 359/243; 345/107; 204/478, 485

(56) References Cited

U.S. PATENT DOCUMENTS

| 5,608,555 | A | * | 3/1997 | Onishi et al. ................ 349/156 |
| 6,545,291 | B1 | * | 4/2003 | Amundson et al. ........... 257/40 |
| 2002/0018043 | A1 | * | 2/2002 | Nakanishi .................... 345/107 |
| 2002/0131152 | A1 | * | 9/2002 | Liang et al. ................. 359/296 |

* cited by examiner

Primary Examiner—Jordan M. Schwartz
Assistant Examiner—Jessica Stultz
(74) Attorney, Agent, or Firm—Fitzpatrick, Cella, Harper & Scinto

(57) ABSTRACT

A display element is disclosed which comprises a pair of substrates, a display medium interposed between the substrates which medium may comprise electrophoretic particles and a dispersion medium, and partition walls with which the display medium is divided in the direction perpendicular to the substrate faces. The partition walls are formed of a self-assembling material, and a fluid dispersion such as an electrophoretic fluid containing electrophoretic particles is provided in hollows defined by the partition walls and the substrates.

14 Claims, 15 Drawing Sheets

DISPLAY ELEMENT AND PROCESS FOR ITS MANUFACTURE

BACKGROUND OF THE INVENTION

1. Field of the Invention

This invention relates to a display element and a process for manufacturing the same. More particularly, it relates to a display element in which partition walls with which a display medium interposed between a pair of substrates is divided for each display pixel in the direction perpendicular to the substrate faces have been formed by a self-assembling material and a process for manufacturing the same.

2. Related Background Art

In recent years, with the advancement of information machinery, there has been an increasing demand for thin-type display elements with low power consumption. Research and development on display elements conformable to such demands is earnestly conducted. In particular, liquid crystal display elements can perform display by electrically controlling the arrangement of liquid crystal molecules to change optical characteristics of liquid crystal and have been developed and commercialized as display elements that can meet the above demand.

These liquid crystal display elements, however, have problems in that characters or letters displayed on a screen are viewed with difficulty depending on the angles at which a user watches the screen and on reflected light and in that there is a load on sight that is ascribable to the flickering of a light source or to low brightness. These problems have not been solved well. Accordingly, studies are energetically made on display elements having less load on sight.

As one such display element, an electrophoretic display element invented by Harold D. Lees et al. is known (U.S. Pat. No. 3,612,758). FIGS. 13A and 13B schematically illustrate the construction of the electrophoretic display element and its performance principle.

As shown in FIG. 13A, the electrophoretic display element has a pair of substrates 5a and 5b disposed leaving a stated space between them, and electrodes 5c an 5d are formed on the substrates 5a and 5b, respectively. Also, a large number of positively charged and colored electrophoretic particles 5e and a dispersion medium 5f colored in a color different from that of the electrophoretic particles are filled into the space between the substrates. Still also, partition walls 5g are so disposed as to divide the space into a large number of pixels arranged in the plane direction of the substrates and are so constructed that the electrophoretic particles can be prevented from localizing and also the space between the substrates can be defined.

In such a display element, as shown in FIG. 13A, a voltage with negative polarity is applied to the electrode 5c on the lower side as viewed in the drawing and also a voltage with positive polarity is applied to the electrode 5d on the upper side as viewed in the drawing, whereupon the electrophoretic particles 5e standing charged positively collect in such a way that they cover the electrode 5c on the lower side. When the display element is viewed from the direction shown by an arrow, display is performed in the same color as that of the dispersion medium 5f. On the contrary, as shown in FIG. 13B, a voltage with positive polarity is applied to the electrode 5c on the lower side as viewed in the drawing, and also a voltage with negative polarity is applied to the electrode 5d on the upper side as viewed in the drawing, whereupon the electrophoretic particles 5e collect in such a way that they cover the electrode 5d on the upper side. When the display element is viewed from the direction shown by an arrow, display is performed in the same color as that of the electrophoretic particles 5e. Such drive is performed for each pixel, whereby any desired image is displayed by a large number of pixels.

Meanwhile, as a self-luminescent display element, an organic EL(electroluminescence) element proposed by C. W. Tang et al. is known (Appl. Phys. Lett., vol. 51, p.913 (1987)).

FIG. 14 schematically illustrates a conventional organic EL display element. As shown in FIG. 14, the display element has a pair of substrates 6a and 6b disposed leaving a stated space between them. The substrate 6a is a transparent glass sheet or the like. On the substrate 6a, a first electrode 6c formed of a transparent electrode of ITO (indium-tin oxide) or the like is provided. On the substrate 6a including the first electrode 6c, partition walls 6e having electrical insulation properties are arranged and formed at given intervals. On the first electrode 6c at which partition walls 6e are not formed, at least one layer of thin film of an organic EL medium 6f is formed. Second electrodes 6d are further formed on the organic EL medium 6f. The face side where the partition walls 6e and the organic EL medium 6f are formed is covered with a substrate 6b, and the edge space between the substrates 6a and 6b is sealed with an adhesive 6g.

In the organic EL display element, electric fields are applied across the first electrode 6c and the second electrodes 6d, where the organic EL mediums 6f emit light to perform display through the substrate 6a.

Conventional electrophoretic display elements have had a problem as stated below. In order to perform more highly minute display, the electrode pattern must be made more highly minute, and correspondingly thereto the partition walls also must be minutely provided. However, to form partition walls minutely on the substrate by conventional lithography, a large number of steps are required, and the partition walls can not be formed simply.

Conventional organic EL display elements also have had a problem as stated below. In order to perform more highly minute display, pixels must be made smaller, and correspondingly thereto the partition walls also must be minutely provided. However, to form partition walls minutely on the substrate by conventional lithography, a large number of steps are required, and the partition walls can not be formed simply.

SUMMARY OF THE INVENTION

The present invention was made in order to solve the problems stated above. Accordingly, an object of the present invention is to provide a display element having partition walls which can be simply formed without relying on any conventional lithographic techniques.

Another object of the present invention is to provide a display element in which the partition walls with which a display medium interposed between a pair of substrates is divided in the direction perpendicular to the substrate faces are formed simply by self-assembly of a self-assembling material to enable highly minute display.

The present invention is to provide a display element comprising a pair of substrates, a display medium interposed between the substrates, and partition walls with which the display medium is divided in the direction perpendicular to the substrate faces, the display medium being provided in hollows defined by the partition walls and the substrates and the partition walls being formed of a self-assembling material.

The self-assembling material is herein meant to be a material that can form a structural body by spontaneous association of molecules of the material when a solution of the material is cast on a substrate at high atmospheric humidity. Its details are given later.

As a feature of the present invention, the display element may have structure in which the hollows defined by the partition walls and the substrates are arranged in a honeycomb fashion, and the hollows may each have a hollow diameter of from 10 μm to 200 μm and a partition wall height within the range of from 0.1 μm to 100 μm, having an aspect ratio within the range of from 0.1 to 100, and may be arranged at intervals between hollows of from 10 μm to 210 μm.

The self-assembling material may also comprise a block copolymer, a homopolymer, a polyion complex or an organic and/or inorganic hybrid material.

The partition walls may also have a conductivity or may be in a structural body formed by self-assembly of a conductive polymer.

The present invention is also a process for manufacturing a display element comprising a pair of substrates, a display medium interposed between the substrates, and partition walls with which the display medium is divided in the direction perpendicular to the substrate faces, the process comprising the steps of:

(1) forming the partition walls on one substrate by self-assembly of a self-assembling material;

(2) filling a display medium into hollows defined by the partition walls and the substrates; and (3) covering the display medium and the tops of the partition walls with the other opposing substrate, and sealing the edge space between the substrates.

DETAILED DESCRIPTION OF THE PREFERRED EMBODIMENTS

Figure 1A:
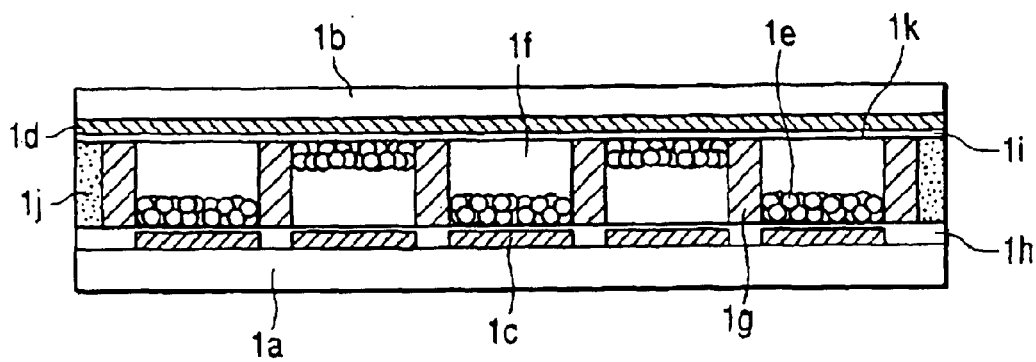
FIGS. 1A and 1B are sectional views, each showing an embodiment of an electrophoretic display element according to the present invention.
Figure 1B:
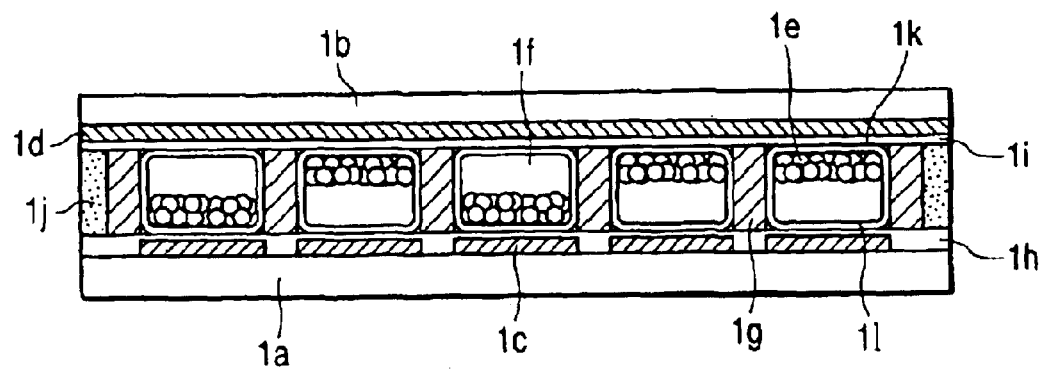

FIGS. 1A and 1B are sectional views, each showing an embodiment of the display element according to the present invention, and show an example in which the display element is an electrophoretic display element.

As shown in FIG. 1A, the electrophoretic display element of the present invention has a first substrate $1a$ and, formed at desired positions on it, partition walls $1g$ formed of a self-assembling material. Hollows $1k$ are defined by the first substrate $1a$ and partition walls $1g$ and are arranged in a honeycomb fashion in a planar view. A fluid dispersion comprised of electrophoretic particles $1e$ and a dispersion medium $1f$ is filled into the hollows $1k$, and these are covered with a second substrate $1b$. The edge space between the first substrate $1a$ and the second substrate $1b$ is sealed with an adhesive $1j$. First electrodes $1c$ and a second electrode $1d$ are formed on the first substrate $1a$ and the second substrate $1b$, respectively, and insulating layers $1h$ and $1i$ are formed on the electrodes $1c$ and $1d$, respectively. This electrophoretic display element has its display face on the side where the second substrate $1b$ is present.

FIG. 1B shows an electrophoretic display element making use of microcapsules. Microcapsules $1l$ having enveloped the fluid dispersion comprised of electrophoretic particles $1e$ and a dispersion medium $1f$ are filled into the hollows $1k$ defined by the partition walls $1g$, and these are covered with the second substrate $1b$. First electrodes $1c$ and a second electrode $1d$ are formed on the first substrate $1a$ and the second substrate $1b$, respectively, and insulating layers $1h$ and $1i$ are formed on the electrodes $1c$ and $1d$, respectively. When the microcapsules are used, the insulating layer $1i$ need not especially be formed.

In the display element shown in FIGS. 1A and 1B, the first electrodes $1c$ are pixel electrodes which can apply desired electric fields independently to the fluid dispersion held in the individual hollows $1k$. These pixel electrodes are provided with switching elements. Selective signals are applied to individual row electrodes from a matrix drive circuit (not shown), and control signals and outputs from a drive transistor are further applied to column electrodes. Thus, desired electric fields can be applied to the fluid dispersion held in the individual hollows $1k$. The fluid dispersion held in the individual hollows $1k$ is controlled by the electric fields applied through the first electrodes $1c$, and each pixel displays a color the electrophoretic particles have and a color the fluid dispersion has. The second electrode $1d$ is a transparent electrode having been so formed as to cover the fluid dispersion at entirely the same potential.

A process for manufacturing the display element of this embodiment is described below with reference to FIGS. 2A to 2J and FIGS. 3A an 3B.

Figure 2A:
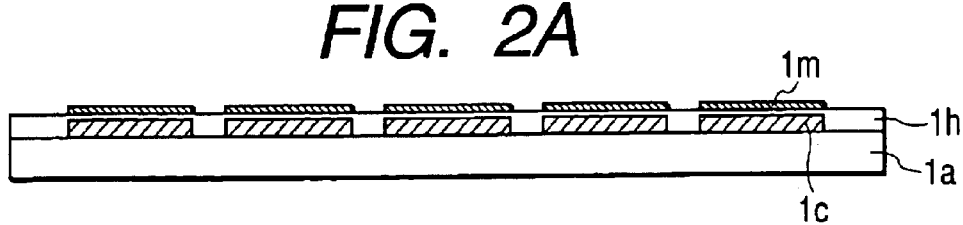
FIGS. 2A, 2B, 2C, 2D, 2E, 2F, 2G, 2H, 2I and 2J present a flow sheet showing an example of the process for manufacturing an electrophoretic display element according to the present invention.
Figure 2B:
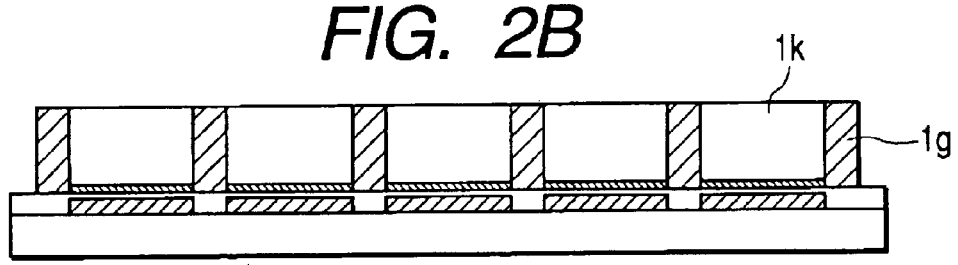
Figure 2C:
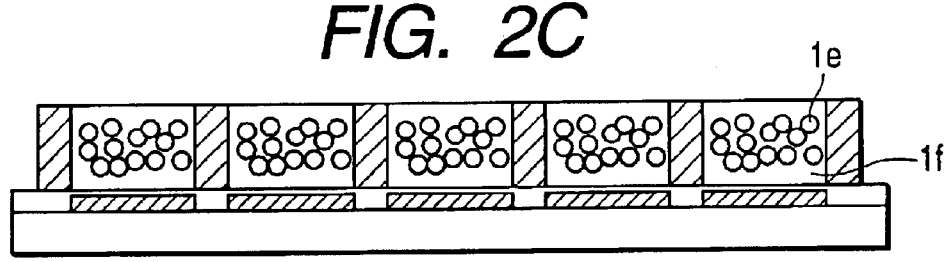
Figure 2D:
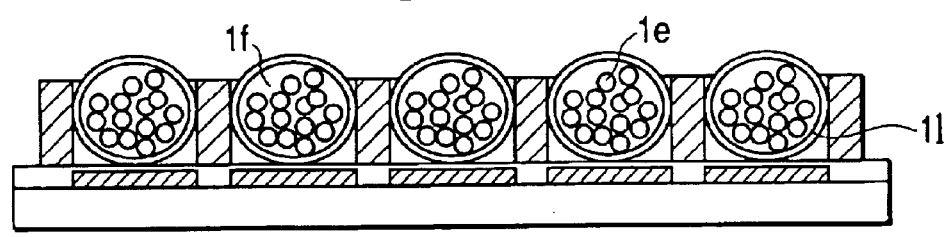
Figure 2E:
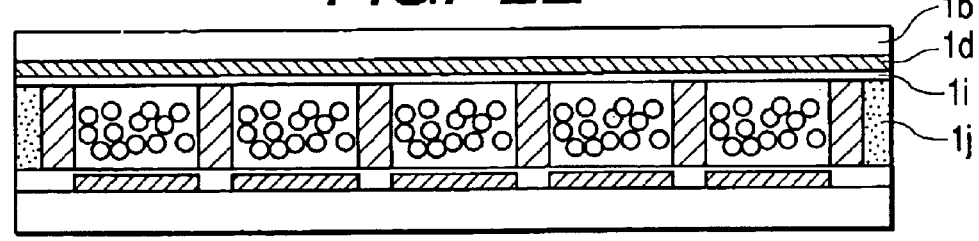
Figure 2F:
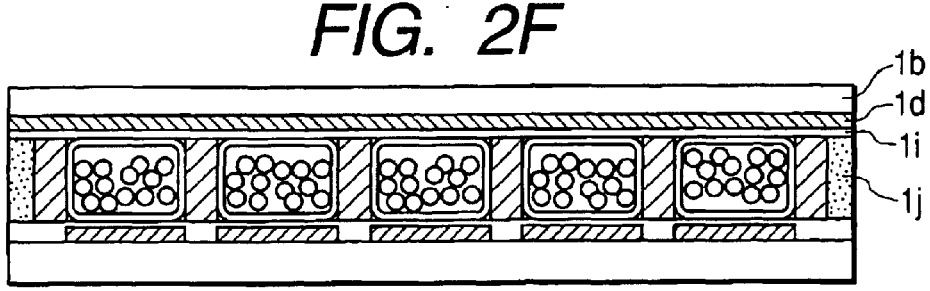
Figure 2G:
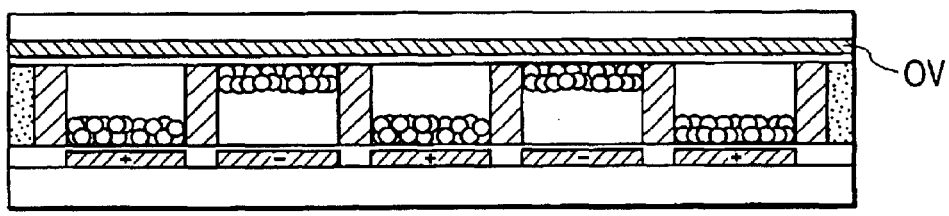
Figure 2H:
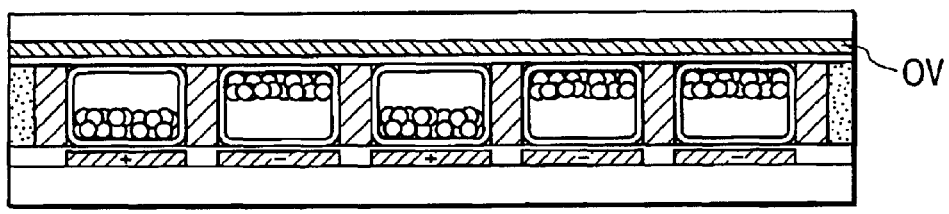
Figure 2I:
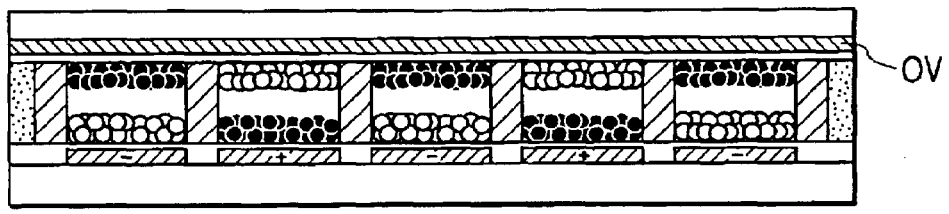
Figure 2J:
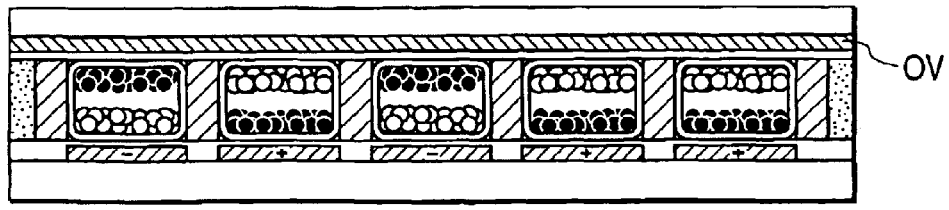
Figure 3A:
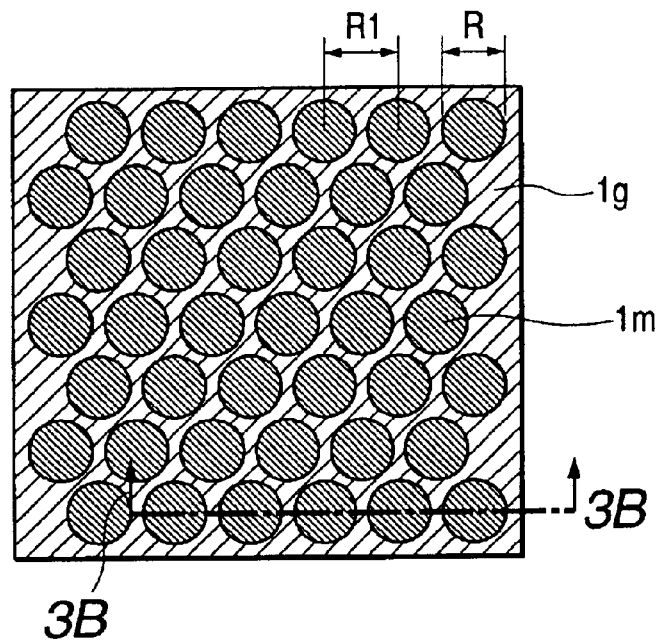
FIGS. 3A and 3B are schematic views of partition walls having a structure in which the hollows are arranged in a honeycomb fashion.

As shown in FIGS. 2A to 2J, the first electrodes 1c for controlling the fluid dispersion are formed patternwise on the first substrate 1a in circles, each having a desired diameter, and also in a honeycomb fashion in a planar view (FIG. 3A). Next, after an insulating layer 1h has been formed, hydrophilic areas 1m are formed patternwise in the same form as, and at the positions right over, the first electrodes 1c to provide on the insulating layer 1h a pattern of areas having different surface energy. (See FIG. 2A.)

The first substrate 1a is any desired insulating member which supports the electrophoretic display element, and glass or plastic may be used.

In the pattern formation of the first electrodes 1c, photolithography may be used. As materials for the first electrodes 1c, Al (aluminum) and ITO (indium-tin oxide) may be used. The first electrodes 1c each have a circular shape and may have a diameter of from 10 $\mu$m to 200 $\mu$m, and preferably from 40 $\mu$m to 120 $\mu$m.

The insulating layer 1h may be formed using a hydrophobic insulating resin. For example, any of epoxy resins, fluorine resins, silicone resins, polyimide resins, polystyrene resins, polyalkene resins and polyacrylate resins may be used.

Next, as described above, after the insulating layer 1h has been formed, the hydrophilic areas 1m are formed patternwise in the same form as, and at the positions right over, the first electrodes 1c to provide on the insulating layer 1h a pattern of areas having different surface energy. In such a case, the portion where the pattern of the hydrophilic areas 1m has not been formed comes to be a hydrophobic area. The hydrophilic areas 1m on the insulating layer 1h can be provided by the patternwise formation of a hydrophilic polymer. As the hydrophilic polymer, any of polyvinyl alcohols, polyacrylamides, polysaccharides, polyacrylic acids or mixtures of any of these may be used. The hydrophilic areas 1m may also be formed patternwise by a conventional printing process or may be formed patternwise by photolithography using the same hydrophilic polymer but endowed with photo-crosslinkability or photo-dissolution properties.

On the first substrate 1a on which the pattern of areas having different surface energy has been formed, a self-assembling material kept dissolved in a solution is made to associate spontaneously and solidify to form the partition walls 1g. A structural body containing the hollows 1k in a honeycomb fashion in a planar view is obtained, which has been made up by the partition walls 1g thus formed. (See FIG. 2B.)

The self-assembling material which forms the partition walls 1g may include block copolymers, homopolymers, polyion complexes, and organic and/or inorganic hybrid materials. These self-assembling materials are materials capable of associating spontaneously from a state in which they are kept dissolved in a solution, at specific portions formed on a substrate, to solidify to form a stated structural body.

Stated specifically, the block copolymer may include block copolymers comprised of polyisoprene and polystyrene and block copolymers comprised of polyisoprene and poly(ethylene oxide).

The block copolymer may further include rod-coil block copolymers whose polymeric chain is constituted of a hard rod unit and a soft coil unit, represented by the following chemical formula (I).

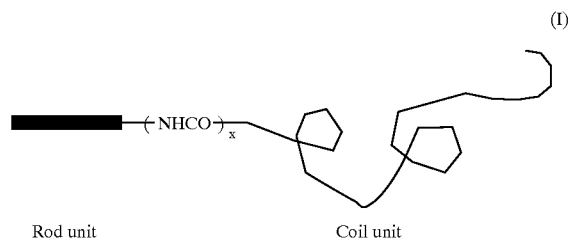

Rod unit    Coil unit

In the formula, x represents 0 or 1.

Stated specifically, as the rod unit of the rod-coil block copolymer, it may include polyquinoline, polyquinoxaline, polyphenylquinoline, polyphenylquinoxaline, poly(p-phenylene), poly(p-phenylene-vinylene), polypyridine, poly(pyridine-vinylene), poly(naphthalene-vinylene), polythiophene, poly(thiophene-vinylene), polypyrrole, polyaniline, polybenzoimidazole, polybenzothiazole, polybenzoxazole, aromatic polyamide, aromatic polyhydrazide, aromatic polyazomethine, aromatic polyimide, aromatic polyester, and derivatives of these.

As for the coil unit of the rod-coil block copolymer, it may include polystyrene, poly($\alpha$-methylstyrene), poly(ethylene oxide), poly(propylene oxide), polyacrylic acid, polymethacrylic acid, poly(2-vinylpyridine), poly(4-vinylpyridine), polyurethane, poly(vinylpyrolidone), poly(methyl methacrylate), poly(n-butyl methacrylate), polyisoprene, polybutadiene, polyethylene, polypropylene, polyethylene glycol, poly(dimethylsiloxane), polystyrene sulfonic acid, polystyrene sulfonate, and derivatives of these.

Preferred is a rod-coil block copolymer whose rod unit is polyphenylquinoline, polyphenylquinoxaline or poly(p-phenylene) and whose coil unit is polystyrene, polybutadiene, polyethylene, polypropylene, polyethylene glycol, poly(2-vinylpyridine) or poly(4-vinylpyridine). More preferred is a block copolymer comprised of polyphenylquinoline and polystyrene (x in the chemical formula (I) is 1), or a block copolymer comprised of poly(p-phenylene) and polystyrene (x in the chemical formula (I) is 0).

If necessary, a surface active agent may also appropriately be added to the block copolymer to form the partition walls 1g.

The homopolymer may include polystyrene, poly(lactic acid), poly(phenyllactic acid), poly(hydroxybutyric acid), poly(ethylene adipate), poly(butylene adipate), polycaprolactone, poly(methyl methacrylate), poly(butylene carbonate) and poly(ethylene carbonate). When the partition walls 1g are formed by self-assembly of the homopolymer, it is preferable to add a surface active agent. The surface active agent to be added may include a copolymer of polyethylene glycol with polypropylene glycol and amphiphilic polymers having an acrylamide polymer as a backbone chain skeleton and having a dodecyl group in the hydrophobic side chain and a carboxyl group or a lactose group as a hydrophilic group.

The homopolymer and the surface active agent may be mixed in a proportion of from 99:1 to 50:50 (weight ratio). If the surface active agent is in a proportion of less than 1, uniform honeycomb-shaped hollows 1k may not be obtained. If, on the other hand, the surface active agent is in a proportion of more than 50, the partition walls 1g may undesirably have an insufficient mechanical strength.

The polyion complex may include a polyion complex comprised of poly(styrenesulfonic acid) and a dimethyldihexadecylammonium salt and a polyion complex comprised of poly(styrenesulfonic acid) and a dimethyloctadecylammonium salt.

The organic/inorganic hybrid material may include a hybrid material comprised of bis(hexadecyl phosphate) and tetra(isopropyl) orthotitanate and a hybrid material comprised of bis(tetradecyl phosphate) and tetra(isopropyl) orthotitanate.

Figure 3B:
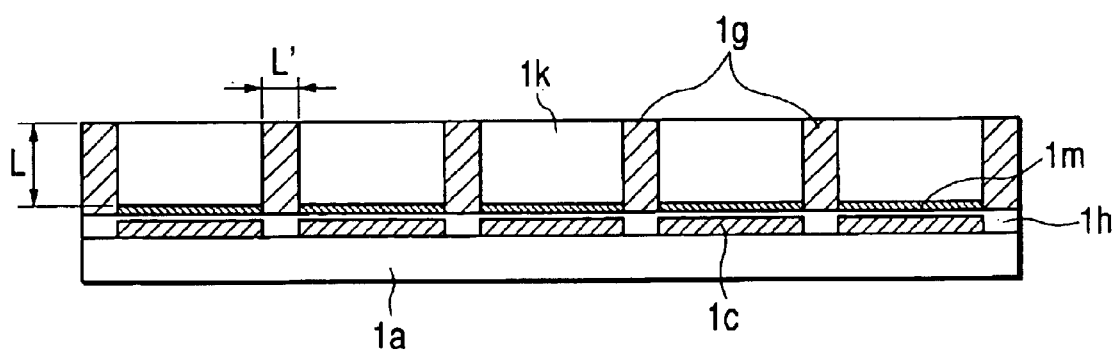

A method of forming the partition walls 1g is further described with reference to FIGS. 3A and 3B. FIG. 3B is a sectional view along the line 3B—3B in FIG. 3A.

On the substrate on which the pattern of areas having different surface energy has been formed as described previously, a solution prepared by dissolving the self-assembling material in an organic solvent is casted in an atmosphere of high humidity, and the organic solvent is gradually evaporated, whereby the partition walls 1g are obtained.

This mechanism is as follows: The organic solvent, when it evaporates, takes latent heat away from the casting fluid, and hence the temperature of the casting fluid surface lowers, so that minute drops of water form on the casting fluid surface by congelation. The drops of water make the surface tension between water and the organic solvent decrease by the action of the hydrophilic part formed on the substrate, and the minute drops of water stabilize in the casting fluid. As the organic solvent further evaporates, the drops of water become arranged in the form that they have packed closest at hydrophilic areas. Then, the drops of water evaporate off finally, so that a structural body can be obtained in which, as shown in FIG. 3A, hollows 1k are arranged over the hydrophilic areas on the substrate in a honeycomb fashion (or hexagonally).

In this way, the pattern of areas having different surface energy, i.e., the pattern constituted of the hydrophilic part and the hydrophobic part, is provided on the substrate surface on which the partition walls 1g are to be formed. Hence, the hollows 1k are led to the position of the hydrophilic part, and the partition walls 1g are formed at the position of the hydrophobic part. Thus, the partition walls 1g can be formed on the substrate with high precision. This enables formation of partition walls with good precision having a minute thickness of 5 $\mu$m or less; this has been impossible to achieve for any conventional photolithography.

The partition walls 1g where the hollows 1k are arranged in a honeycomb fashion are size-controlled by the molecular weight of the self-assembling material, the concentration of the solution and the humidity.

In the case when the self-assembling material is a polymer, the self-assembling material may have a molecular weight of from 1,000 to 2,000,000, and preferably from 5,000 to 500,000. If the self-assembling material has a molecular weight of less than 1,000, the partition walls 1g may undesirably have an insufficient mechanical strength. On the other hand, a self-assembling material having a molecular weight of more than 2,000,000 is not desirable because it may dissolve in the organic solvent with difficulty.

The solution in which the self-assembling material has been dissolved may be in a concentration of from 0.01% by weight to 10% by weight, and preferably from 0.05% by weight to 5% by weight. If the solution is in a concentration of less than 0.01% by weight, the partition walls 1g may undesirably have an insufficient mechanical strength. If, on the other hand, the solution is in a concentration of more than 10% by weight, honeycomb-shaped hollows 1k may not be obtained.

When the partition walls 1g are formed, formation preferably occurs at a humidity of from 50% to 95%. If it is formed at a humidity of less than 50%, the drops of water may insufficiently form on the casting fluid surface by congelation, so that any uniformly honeycomb-shaped hollows 1k can not be formed. If, on the other hand, it is formed at a humidity of more than 95%, it is undesirably very difficult to maintain such an atmosphere.

When the display element is used as the electrophoretic display element described above, the hollows 1k correspond to the size of hydrophilic areas 1m. The hollows 1k may each have a hollow diameter R of from 10 $\mu$m to 200 $\mu$m, and preferably from 40 $\mu$m to 120 $\mu$m, and a partition wall 1g height L of from 10 $\mu$m to 100 $\mu$m, and preferably from 20 $\mu$m to 60 $\mu$m, having an aspect ratio (L/L' in FIG. 3B) of from 10 to 100, and preferably from from 10 to 60, and may be arranged at intervals R1 between hollows of from 10 $\mu$m to 210 $\mu$m, and preferably from 40 $\mu$m to 125 $\mu$m.

The organic solvent may preferably be a volatile organic solvent capable of dissolving the self-assembling material and also one having a low compatibility with water. It may include, e.g., methylene chloride, chloroform, benzene, toluene, xylene, ethyl acetate, butyl acetate, methyl isobutyl ketone, and carbon disulfide. Any of these organic solvents may be used alone or may be used in a combination of two or more types.

In this embodiment, a method is described in which the partition walls 1g are formed by self-assembly of the self-assembling material on the first substrate 1a on which the hydrophilic areas 1m have been formed patternwise on the insulating layer 1h. The method is by no means limited to this. More specifically, where the display element is not required to perform any highly minute display, the partition walls 1g where the hollows 1k are arranged in a honeycomb fashion may be formed on a first substrate 1a on which hydrophilic areas 1m have not been formed patternwise. In such a case, for example, partition walls 1g having hollows 1k, each having a hollow diameter R of approximately from 20 $\mu$m to 40 $\mu$m, may be formed on a first substrate 1a on which circular first electrodes 1c, each having a hollow diameter of 120 $\mu$m, have been formed patternwise. Such a product may be used in the display element.

Next, a fluid dispersion is filled as shown in FIG. 2C. The fluid dispersion comprised of the electrophoretic particles 1e and the dispersion medium 1f is filled into the hollows 1k defined by the partition walls 1g formed at the desired positions on the first substrate 1a. There are no particular limitations on methods therefor. It may be filled using a nozzle of an inkjet system.

In the case of the electrophoretic display element making use of microcapsules, microcapsules 1l having enveloped the fluid dispersion comprised of the electrophoretic particles 1e and the dispersion medium 1f are filled into the hollows 1k defined by the partition walls 1g. (See FIG. 2D)

The microcapsules 1l which envelops the fluid dispersion may be obtained by any known method, such as interfacial polymerization, in-situ polymerization and coacervation, and may preferably have a capsule size which is substantially equal to the size of the hollows 1k.

The material used to form the microcapsules 1l is preferably a material capable of transmitting light sufficiently. Stated specifically, it may include urea-formaldehyde resin, melamine-formaldehyde resin, polyester, polyurethane, polyamide, polyethylene, polystyrene, poly(vinyl alcohol), gelatin, and copolymers of any of these.

There are also no particular limitations on the method by which the microcapsules 1l are filled into the hollows 1k. They may be filled using a nozzle of an ink jet system.

As the electrophoretic particles 1e, usable are organic pigment particles or inorganic pigment particles which can move in the dispersion medium 1f by the aid of electric fields. Stated specifically, when they are white particles, usable are titanium oxide, aluminum oxide, zinc oxide, lead oxide, tin oxide and so forth. As black particles, usable are carbon black, diamond black, aniline black, manganese ferrite black, cobalt ferrite black, titanium black and so forth. As colored particles, pigment particles having colors such as R, G, B, C, M and Y may be used. Stated specifically, usable are red pigments such as cadmium red, quinacridone red, Lake Red, Brilliant Carmine and Madder Lake; green pigments such as Diamond Green Lake, Phthalocyanine Green and Pigment Green B; blue pigments such as cobalt blue, Victoria Blue Lake, Phthalocyanine Blue and Fast Sky Blue; and yellow pigments such as Hanza Yellow, cadmium yellow, Fast Yellow, titanium yellow, yellow iron oxide, chrome yellow, Hanza Yellow and disazo yellow.

The surfaces of particles may also be coated with any known charge control resin (CCR) so as to be used as the electrophoretic particles 1e. Also, as the size of the electrophoretic particles 1e, those having particle diameters of from 0.1 $\mu$m to 10 $\mu$m may preferably be used, and more preferably from 0.2 $\mu$m to 6 $\mu$m. The electrophoretic particles 1e may also preferably be in a concentration of from 1% by weight to 30% by weight.

As the dispersion medium 1f, it may include highly insulating and also colorless and transparent liquids. For example, usable are aromatic hydrocarbons such as toluene, xylene, ethylbenzene and dodecylbenzene; aliphatic hydrocarbons such as hexane, cyclohexane, kerosene, normal paraffin and isoparaffin; halogenated hydrocarbons such as chloroform, dichloromethane, pentachloroethane, 1,2-dibromoethane, 1,1,2,2-tetrabromoethane, trichloroethylene, tetrachloroethylene, trifluoroethylene and tetrafluoroethylene; and natural or synthetic oils of various types. Any of these may be used in a combination of two or more types.

In order to color the dispersion medium 1f, oil-soluble dyes having colors such as R, G, B, C, M and Y may be used. As these oil-soluble dyes, preferred are azo dyes, anthraquinone dyes, quinoline dyes, nitro dyes, nitroso dyes, pennoline dyes, phthalocyanine dyes, metal complex dyes, naphthol dyes, benzoquinone dyes, cyanine dyes, indigo dyes and quinoimine dyes. Any of these may be used in a combination of two or more types.

For example, such dyes may specifically include the following oil-soluble dyes, i.e., Barifast Yellow (1101, 1105, 3108 4120), Oil Yellow (105, 107, 129, 3G, GGS), Barifast Red (1306, 1355, 2303, 3304, 3306, 3320), Oil Pink 312, Oil Scarlet 308, Oil Violet 730, Barifast Blue (1501, 1603, 1605, 1307, 2606, 2610, 3405), Oil Blue (2N, BOS, 613), Macrolex Blue RR, Sumiplast Green G, and Oil Green (502, BG). The oil-soluble dye may preferably be in a concentration of from 0.1% by weight to 3.5% by weight.

If necessary, a charge control agent, a dispersant, a lubricant, a stabilizer and so forth may also be added to the dispersion medium 1f.

After the fluid dispersion comprised of the electrophoretic particles 1e and the dispersion medium 1f has been filled into the hollows 1k defined by the partition walls 1g, these are covered with the second substrate 1b provided with the second electrode 1d and insulating layer 1i, and the edge space between the first substrate 1a and the second substrate 1b is sealed with the adhesive 1j. (See FIG. 2E.)

In the case of the electrophoretic display element making use of microcapsules, after the microcapsules 1l having enveloped the fluid dispersion comprised of the electrophoretic particles 1e and the dispersion medium 1f have been filled into the hollows 1k defined by the partition walls 1g, these are covered with the second substrate 1b provided with the second electrode 1d and insulating layer 1i, and the edge space between the first substrate 1a and the second substrate 1b is sealed with the adhesive 1j. (See FIG. 2F.)

As the second substrate 1b, one made of the same material as that of the first substrate 1a may be used.

As the second electrode 1d, a transparent electrode formed of ITO, an organic conductive film or the like is usually used.

To form the insulating layer 1i, the colorless and transparent insulating resin described for the insulating layer 1h may be used. For example, any of acrylic resins, epoxy resins, fluorine resins, silicone resins, polyimide resins, polystyrene resins and polyalkene resins may be used.

There are no particular limitations on the adhesive 1j, as long as it can retain adhesive effect over a long period of time. For example, any of epoxy resins, acrylic resins, urethane resins, vinyl acetate resins, phenolic resins, polyester resins, polybutadiene resins and silicone resins may be used alone or in a combination of two or more types.

The display is performed by applying a voltage across the electrodes. For example, where white electrophoretic particles charged negatively and a dispersion medium colored in blue are used, a blue image can be displayed when the white electrophoretic particles are collected on the first electrodes 1c, and a white image can be displayed when collected on the second electrode 1d. (See FIGS. 2G and 2H.)

As another example of the display, where white electrophoretic particles charged positively, black electrophoretic particles charged negatively and a colorless and transparent dispersion medium are used, a white image can be displayed when the white electrophoretic particles are collected on the second electrode 1d, and a black image can be displayed when the black electrophoretic particles are collected on the second electrode 1d. (See FIGS. 2I and 2J.)

The voltage to be applied may differ depending on the charge quantity of the electrophoretic particles and the distance between the electrodes. Usually, a voltage of 10 V to tens of volts is necessary.

In the display element having this construction, the partition walls can simply be formed on the substrate in a minute thickness and at specific positions on the substrate by self-assembly of the self-assembling material. Hence, a display element which can perform highly minute display can simply be manufactured.

Another embodiment of the display element of the present invention is described below.

Figure 4A:
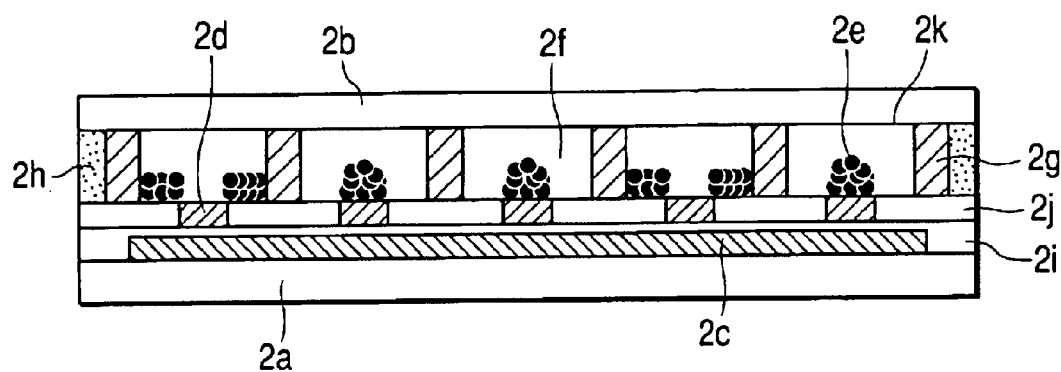
FIGS. 4A and 4B are sectional views, each showing another embodiment of the electrophoretic display element according to the present invention.
Figure 4B:
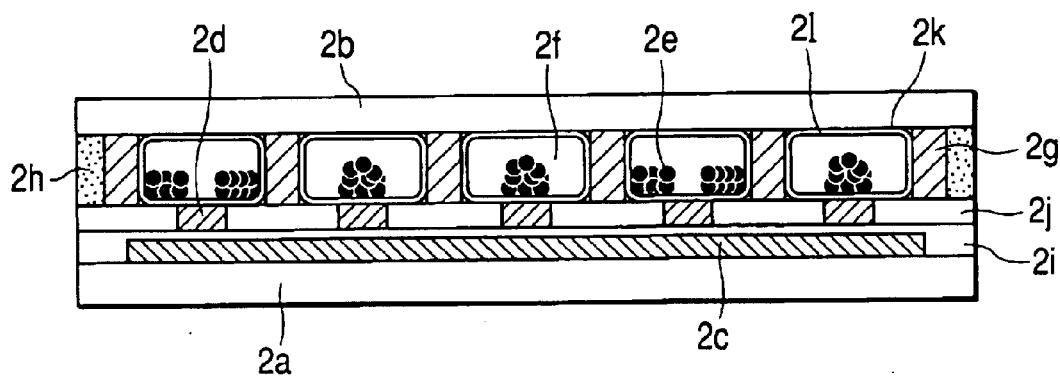

FIGS. 4A and 4B are sectional views, each showing another embodiment of the electrophoretic display element according to the present invention.

As shown in FIG. 4A, the electrophoretic display element of the present invention has construction in which a pair of electrodes 2c and 2d are formed on a first substrate 2a. Insulating layers 2i and 2j are formed between the electrodes and on the second electrode 2d, respectively. The insulating layer 2i may be colored or may be colorless and transparent, but the insulating layer 2i is colorless and transparent. At desired positions on the first substrate 2a having the electrodes and insulating layers, partition walls 2g are formed by self-assembly of the self-assembling material. Hollows 2k are defined by the first substrate 2a and partition walls 2g and are arranged in a honeycomb fashion. A fluid dispersion comprised of electrophoretic particles 2e and a dispersion medium 2f is filled into the hollows 2k, and these are covered with a second substrate 2b. The edge space between the first substrate 2a and the second substrate 2b is sealed with an adhesive 2h. This electrophoretic display element has its display face on the side where the second substrate 2b is present.

FIG. 4B shows an electrophoretic display element making use of microcapsules. Microcapsules 2l having enveloped the fluid dispersion comprised of electrophoretic particles 2e and a dispersion medium 2f are filled into the hollows 2k defined by the partition walls 2g, and these are covered with the second substrate 2b. The edge space between the first substrate 2a and the second substrate 2b is sealed with an adhesive 2h.

In the display element shown in FIGS. 4A and 4B, the second electrodes 2d are pixel electrodes which can apply desired electric fields independently to the fluid dispersion held in the individual hollows 2k. These pixel electrodes are provided with switching elements. Scanning selective signals are applied to individual row electrodes from a matrix drive circuit (not shown), and control signals and outputs from a drive transistor are further applied to column electrodes. Thus, desired electric fields can be applied to the fluid dispersion held in the individual hollows 2k. The fluid dispersion held in the individual hollows 2k is controlled by the electric fields applied through the second electrodes 2d, and each pixel displays a color (black) the electrophoretic particles have and a color (white) the insulating layer 2i has. The first electrode 2c is a common electrode which applies voltage to the fluid dispersion at entirely the same potential.

A process for manufacturing the display element of this embodiment is described below with reference to FIGS. 5A to 5H.

FIGS. 5A to 5H present a flow sheet showing another example of the process for manufacturing an electrophoretic display element according to the present invention. A reflection-type display element is described first.

As a common electrode, the first electrode 2c is formed on the first substrate 2a, and the insulating layer 2i is further formed thereon. Subsequently, the second electrodes 2d for controlling the fluid dispersion are formed patternwise in circles, each having a desired diameter, and also in a honeycomb fashion. Thereafter, the insulating layer 2j is formed. Next, on the insulating layer 2j, hydrophilic areas 2m are formed patternwise on the concentric circles of the second electrodes 2d in circles, each having a desired diameter, to provide on the insulating layer 2j a pattern of areas having different surface energy. (See FIG. 5A.)

The first substrate 2a is any desired insulating member which supports the electrophoretic display element, and glass or plastic may be used.

As the first electrode 2c, a light-reflecting metal electrode such as an Al electrode may be used.

In the insulating layer 2i formed on the first electrode 2c, a mixture of a colorless and transparent insulating resin with fine particles for scattering light as exemplified by fine particles of aluminum oxide or titanium oxide may be used. The colorless and transparent insulating resin may include those described previously with regard to FIG. 2E. Alternatively, without the use of the fine particles, a method may be used in which the light is scattered utilizing unevenness of metal electrode surfaces.

In the second electrode 2d, a conductive material which looks pitch-black when viewed on the viewer's side is used, as exemplified by titanium carbide, black-treated Cr, and Al or Ti with a black layer formed on the surface. In the pattern formation of the second electrodes 2d, photolithography may be used.

Subsequently, the insulating layer 2j is formed on the second electrodes 2d. The insulating layer 2j may be formed using the above colorless and transparent insulating resin.

Next, as described above, on the insulating layer 2j, the hydrophilic areas 2m are formed patternwise on the concentric circles of the second electrodes 2d in circles, each having a desired diameter, to provide on the insulating layer 2j the pattern of areas having different surface energy. In such a case, the portion where the pattern of the hydrophilic areas 2m has not been formed comes to be a hydrophobic area. The hydrophilic areas 2m on the insulating layer 2j can be provided by the patternwise formation of a hydrophilic polymer. The hydrophilic polymer described previously may be used alone or in the form of a mixture. In the pattern formation of the hydrophilic areas 2m, a printing process or photolithography may be used as described previously.

Display contrast in this case depends greatly on the area ratio of the second electrodes 2d to the hydrophilic areas 2m. Hence, in order to make the contrast high, the exposure area of the second electrodes 2d must be made smaller than that of the hydrophilic areas 2m. Usually, their area ratio may preferably be approximately from 1:2 to 1:5. The hydrophilic areas 2m may each have a diameter of from 10 $\mu$m to 200 $\mu$m, and preferably from 40 $\mu$m to 120 $\mu$m.

On the first substrate 2a on which the pattern of areas having different surface energy has been formed, partition walls 2g where hollows 2k are arranged in a honeycomb fashion are formed using the self-assembling material. (See FIG. 5B.)

The self-assembling material which forms the partition walls 2g where hollows 2k are arranged in a honeycomb fashion may include the block copolymers, homopolymers, polyion complexes, and organic and/or inorganic hybrid materials described previously. The partition walls 2g shown in FIGS. 6A and 6B may be obtained by the same method described previously. FIG. 6B is a sectional view along the line 6B—6B in FIG. 6A.

When the display element is used as the electrophoretic display element described above, the hollows 2k correspond to the size of hydrophilic areas 2m. The hollows 2k may each have a hollow diameter R of from 10 $\mu$m to 200 $\mu$m, and preferably from 40 $\mu$m to 120 $\mu$m, and a partition wall 2g height L of from 10 $\mu$m to 100 $\mu$m, and preferably from 20 $\mu$m to 60 $\mu$m, having an aspect ratio (L/L') of from 10 to 100, and preferably from from 10 to 60, and may be arranged at intervals R1 between hollows of from 10 $\mu$m to 210 $\mu$m, and preferably from 40 $\mu$m to 125 $\mu$m.

Figure 5A:
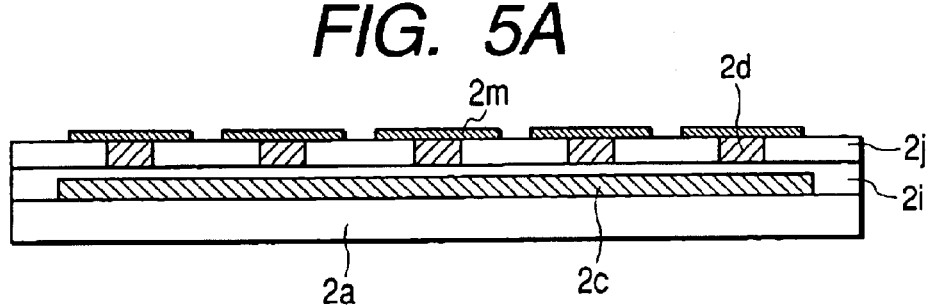
FIGS. 5A, 5B, 5C, 5D, 5E, 5F, 5G and 5H present a flow sheet showing another example of the process for manufacturing an electrophoretic display element according to the present invention.
Figure 5B:
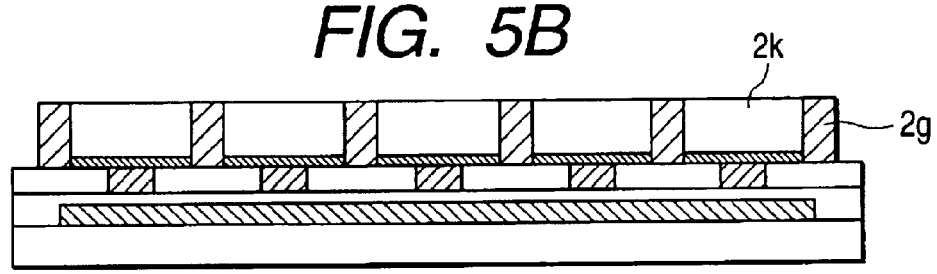
Figure 5C:
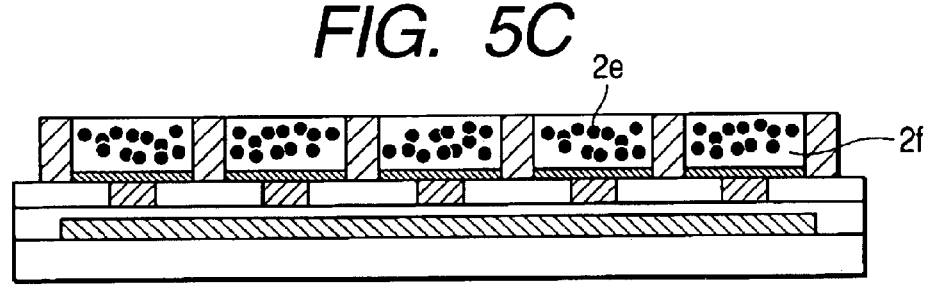
Figure 5D:
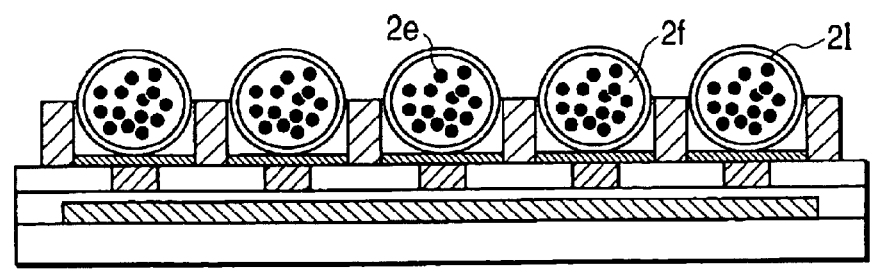
Figure 5E:
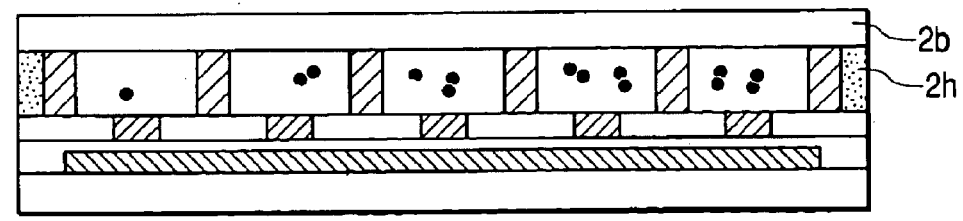
Figure 5F:
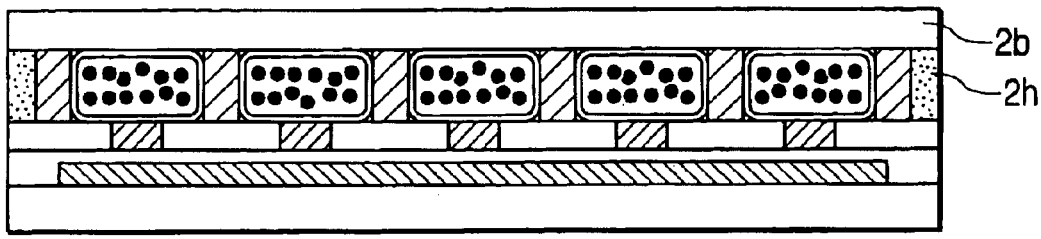

The fluid dispersion comprised of the electrophoretic particles 2e and the dispersion medium 2f is filled into the hollows 2k defined by the partition walls 2g formed at the desired positions on the first substrate 2a (See FIG. 5C.)

There are no particular limitations on methods for filling the fluid dispersion into the hollows 2k. It may be filled using the above nozzle of an ink jet system.

In the case of the electrophoretic display element making use of microcapsules, microcapsules 2l having enveloped the fluid dispersion comprised of the electrophoretic particles 2e and the dispersion medium 2f are filled into the hollows 2k defined by the partition walls 2g. (See FIG. 5D.)

The microcapsules 2l which envelop the fluid dispersion may be obtained, as described previously, by any known method, such as interfacial polymerization, in-situ polymerization and coacervation, and may preferably have a capsule size which is substantially equal to the size of the hollows 2k. As materials for forming the microcapsules 2l, the same polymer materials as those described previously may be used.

There are also no particular limitations on the method by which the microcapsules 2l are filled into the hollows 2k. They may be filled using the above nozzle of an ink jet system. With regard to the electrophoretic particles 2e and dispersion medium 2f, the same particles and dispersion medium as those described previously may be used.

After the fluid dispersion comprised of the electrophoretic particles 2e and the dispersion medium 2f has been filled into the hollows 2k defined by the partition walls 2g, these are covered with the second substrate 2b, and the edge space between the first substrate 2a and the second substrate 2b is sealed with the adhesive 2h. (See FIG. 5E.)

In the case of the electrophoretic display element making use of microcapsules, after the microcapsules 2l having enveloped the fluid dispersion comprised of the electrophoretic particles 2e and the dispersion medium 2f have been filled into the hollows 2k defined by the partition walls 2g, these are covered with the second substrate 2b, and the edge space between the first substrate 2a and the second substrate 2b is sealed with the adhesive 2h. (See FIG. 5F.)

As the second substrate 2b, one made of the same materials as that of the first substrate 2a may be used. As the adhesive 2h, the adhesive described previously may be used.

In the transmission-type display element, in the above manufacturing process, a transparent electrode formed of ITO, an organic conductive film or the like is used as the first electrode 2c, and a transparent insulating layer 2i is formed on the first electrode 2c.

The display is performed by applying voltage across the electrodes. For example, black electrophoretic particles charged negatively and a colorless and transparent dispersion medium are used, the top of the insulating layer 2i is white and the top of the second electrodes 2d is black, a white image can be displayed when the electrophoretic particles are collected on the second electrodes 2d, and a black image can be displayed when collected on the first electrode 2c. (See FIGS. 5G and 5H.)

The voltage to be applied may differ depending on the charge quantity of the electrophoretic-particles and the pitch between the electrodes. Usually, a voltage of 10 V to tens of volts is necessary.

In the display element having this construction, the partition walls formed of the self-assembling material can simply be formed on the substrate in a minute thickness and at specific positions on the substrate. Hence, a display element which can perform highly minute display can simply be manufactured.

Still another embodiment of the display element of the present invention is described below.

Figure 7A:
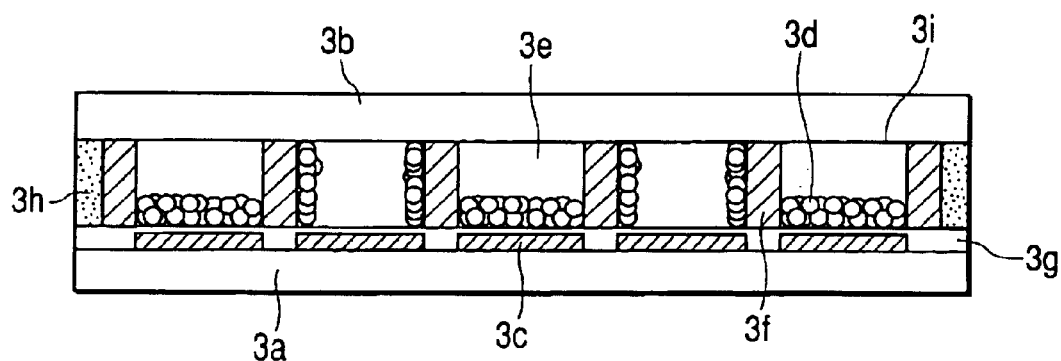
FIGS. 7A and 7B are sectional views each, showing still another embodiment of the electrophoretic display element according to the present invention.
Figure 7B:
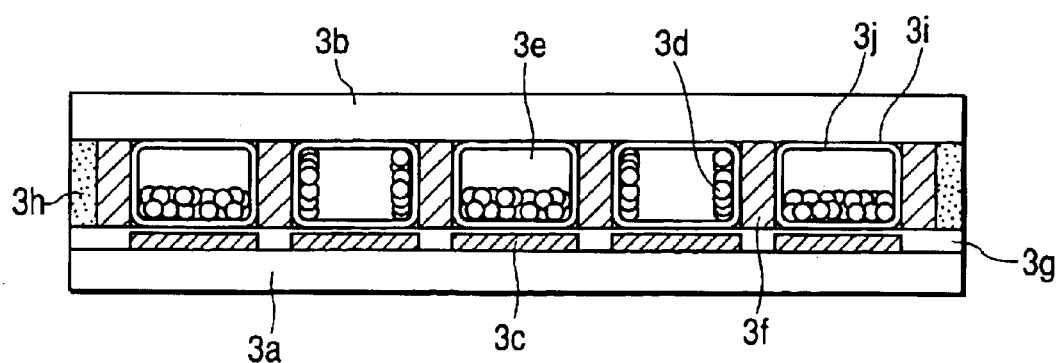

FIGS. 7A and 7B are sectional views each showing still another embodiment of the electrophoretic display element according to the present invention.

As shown in FIG. 7A, in the electrophoretic display element of the present invention, first electrodes 3c are formed on a first substrate 3a, and insulating layer 3g is further formed on the first electrodes 3c. Conductive partition walls 3f formed of the self-assembling material are formed at desired positions on the first substrate 3a having the electrodes and insulating layer. Hollows 3i are defined by the first substrate 3a and conductive partition walls 3f and are arranged in a honeycomb fashion. A fluid dispersion comprised of electrophoretic particles 3d and a dispersion medium 3e is filled into the hollows 3i, and these are covered with a second substrate 3b. The edge space between the first substrate 3a and the second substrate 3b is sealed with an adhesive 3h. This electrophoretic display element has its display face on the side where the second substrate 3b is present.

FIG. 7B shows an electrophoretic display element making use of microcapsules. Microcapsules 3j having enveloped the fluid dispersion comprised of electrophoretic particles 3d and a dispersion medium 3e are filled into the hollows 3i defined by the conductive partition walls 3f, and these are covered with the second substrate 3b. The edge space between the first substrate 3a and the second substrate 3b is sealed with an adhesive 3h.

In the display element shown in FIGS. 7A and 7B, the first electrodes 3c are pixel electrodes which can apply desired electric fields independently to the fluid dispersion held in the individual hollows 3i. These pixel electrodes are provided with switching elements. Selective signals are applied to individual row electrodes from a matrix drive circuit (not shown), and control signals and outputs from a drive transistor are further applied to column electrodes. Thus, desired electric fields can be applied to the fluid dispersion held in the individual hollows 3i. The fluid dispersion held in the individual hollows 3i is controlled by the electric fields applied through the first electrodes 3c, and each pixel displays a color (white) the electrophoretic particles have and a color (black) the first electrodes 3c have. The conductive partition walls 3f are common electrodes which apply voltage to the fluid dispersion at entirely the same potential.

FIGS. 8A to 8J present a flow sheet showing still another example of the process for manufacturing an electrophoretic display element according to the present invention.

Figure 8A:
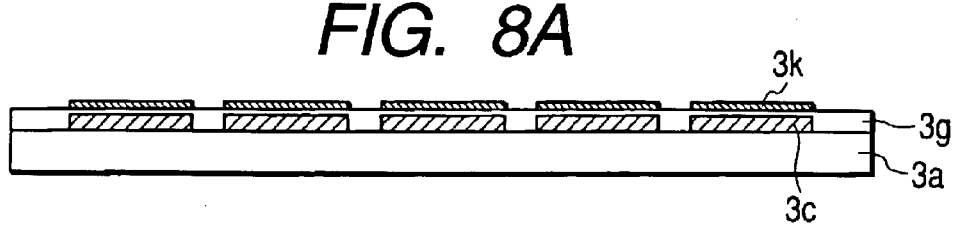
FIGS. 8A, 8B, 8C, 8D, 8E, 8F, 8G, 8H, 8I and 8J present a flow sheet showing still another example of the process for manufacturing an electrophoretic display element according to the present invention.
Figure 8B:
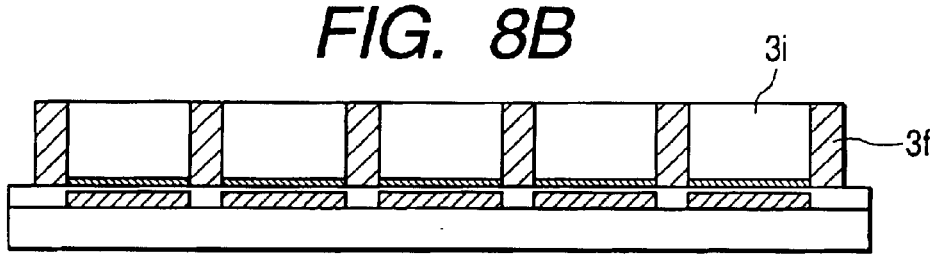
Figure 8C:
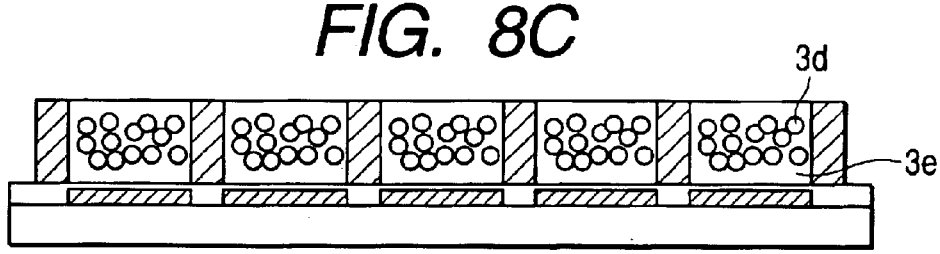
Figure 8D:
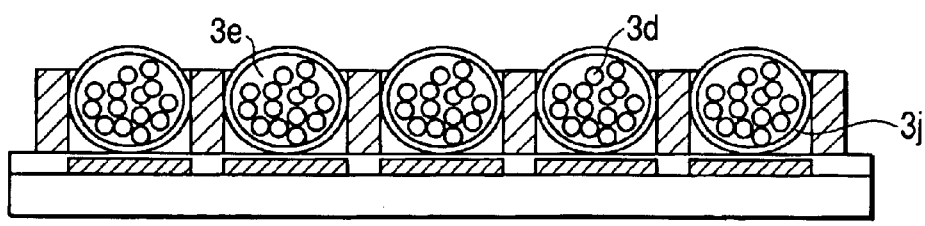
Figure 8E:
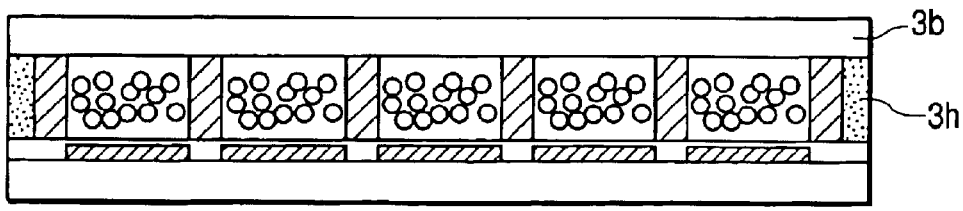
Figure 8F:
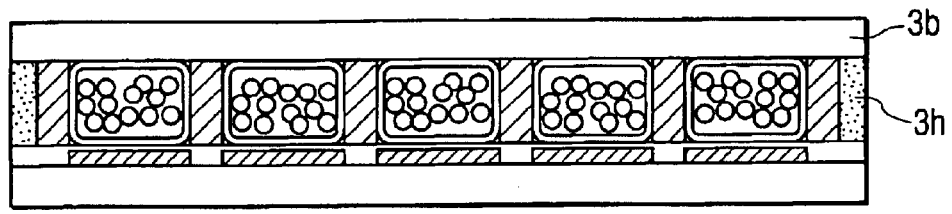

As shown in FIG. 8A, the first electrodes 3c for controlling the fluid dispersion are formed patternwise in circles, each having a desired diameter, and also in a honeycomb fashion. Next, after the insulating layer 3g has been formed thereon, hydrophilic areas 3k are formed patternwise in the same form as, and at the positions right over, the first electrodes 3c to provide on the insulating layer 3g a pattern of areas having different surface energy. (See FIG. 8A.)

The first substrate 3a is any desired insulating member which supports the electrophoretic display element, and glass or plastic may be used.

In the first electrodes 3c, a conductive material which looks pitch-black when viewed on the viewer's side is used, as exemplified by titanium carbide, black-treated Cr, and Al or Ti with a black layer formed on the surface as described previously. In the pattern formation of the first electrodes 3c, photolithography may be used.

The first electrodes 3c each have a circular shape and may have a diameter of from 10 μm to 200 μm, and preferably from 40 μm to 120 μm.

The insulating layer 3g may be formed using a colorless and transparent insulating resin. As described previously, any of acrylic resins, epoxy resins, fluorine resins, silicone resins, polyimide resins, polystyrene resins and polyalkene resins may be used.

Next, as described above, after the insulating layer 3g has been formed, the hydrophilic areas 3k are formed patternwise in the same form as, and at the positions right over, the first electrodes 3c to provide on the insulating layer 3g a pattern of areas having different surface energy. In such a case, the portion where the pattern of the hydrophilic areas 3k has not been formed comes to be a hydrophobic area. The hydrophilic areas 3k on the insulating layer 3h can be provided by the patternwise formation of a hydrophilic polymer. The hydrophilic polymer described previously may be used alone or in the form of a mixture. In the pattern formation of the hydrophilic areas 3k, a printing process or photolithography may be used as described previously.

On the first substrate 3a on which the pattern of areas having different surface energy has been formed, partition walls 3g where hollows 3k are arranged in a honeycomb fashion are formed using the self-assembling material. (See FIG. 8B.)

The self-assembling material which forms the conductive partition walls 3f where hollows 3i are arranged in a honeycomb fashion may include conductive polymers. For example, usable are heterocyclic type conductive polymers such as polythiophene and polypyrrole; polyphenylene type conductive polymers such as polyparaphenylene, polyphenylene vinylene and polyphenylene sulfide; polyacetylene type conductive polymers; polyaniline type conductive polymers; conductive polymers having a sulfonic acid group, such as poly(2-acryloxyethyldimethylsulfonium chloride) and poly(glycidyldimethylsulfonium chloride); conductive polymers having a phosphonic acid group, such as poly(glycidyltributylphosphonium chloride); and conductive polymers having a quaternary ammonium salt group, such as poly(vinyltrimethylammonium chloride) and poly (N-methylvinylpyridium chloride). The conductive polymers may optionally be doped with an electron donor or an electron acceptor.

When the conductive partition walls 3f are formed by self-assembly of the conductive polymer, a surface active agent may optionally appropriately be added. The surface active agent to be added may include, as described previously, a copolymer of polyethylene glycol with polypropylene glycol, and amphiphilic polymers having an acrylamide polymer as a backbone chain skeleton and having a dodecyl group in the hydrophobic side chain and a carboxyl group or a lactose group as a hydrophilic group.

The conductive polymer and the surface active agent may be mixed in a proportion of from 99:1 to 50:50 (weight ratio). If the surface active agent is in a proportion of less than 1, uniform honeycomb-shaped hollows 3i may not be obtained. If, on the other hand, the surface active agent is in a proportion of more than 50, the conductive partition walls 3f may undesirably have an insufficient mechanical strength.

Figure 9A:
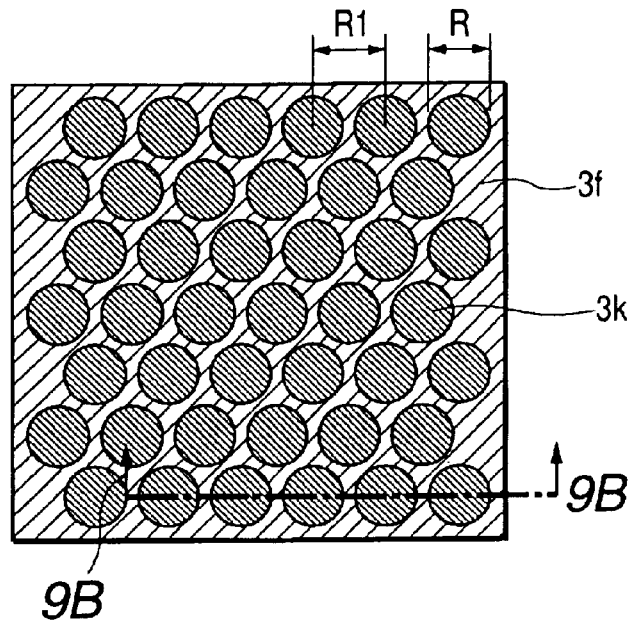
FIGS. 9A and 9B are schematic views of partition walls having a structure in which the hollows are arranged in a honeycomb fashion.
Figure 9B:
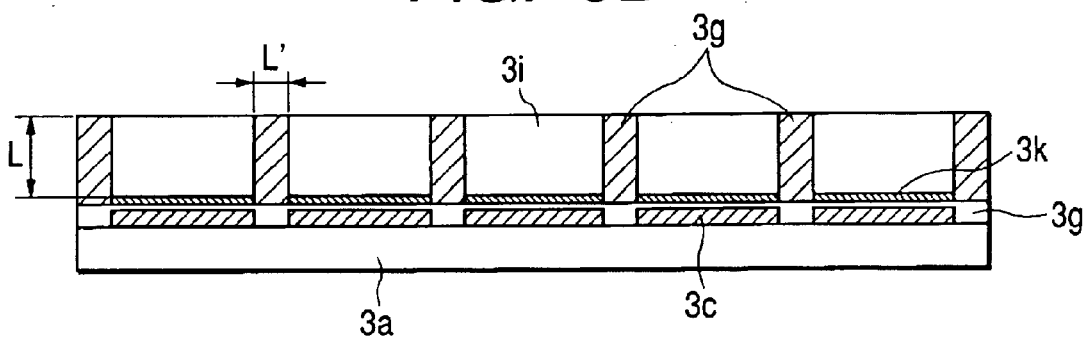

The partition walls 3g shown in FIGS. 9A and 9B may be obtained by the same method described previously. FIG. 9B is a sectional view along the line 9B—9B in FIG. 9A.

When the display element is used as the electrophoretic display element described above, the hollows 3i correspond to the size of hydrophilic areas 3k. The hollows 3i may each have a hollow diameter R of from 10 $\mu$m to 200 $\mu$m, and preferably from 40 $\mu$m to 120 $\mu$m, and a conductive partition wall 3f height L of from 10 $\mu$m to 100 $\mu$m, and preferably from 20 $\mu$m to 60 $\mu$m, having an aspect ratio (L/L') of from 10 to 100, and preferably from from 10 to 60, and may be arranged at intervals R1 between hollows of from 10 $\mu$m to 210 $\mu$m, and preferably from 40 $\mu$m to 125 $\mu$m.

The fluid dispersion comprised of the electrophoretic particles 3d and the dispersion medium 3e is filled into the hollows 3i defined by the conductive partition walls 3f formed at the desired positions on the first substrate 3a. (See FIG. 8C.)

There are no particular limitations on methods for filling the fluid dispersion into the hollows 3i. It may be filled using the above nozzle of an ink jet system.

In the case of the electrophoretic display element making use of microcapsules, microcapsules 3j having enveloped the fluid dispersion comprised of the electrophoretic particles 3d and the dispersion medium 3e are filled into the hollows 3i defined by the conductive partition walls 3f. (See FIG. 8D.)

The microcapsules 3j which envelop the fluid dispersion may be obtained, as described previously, by any known method, such as interfacial polymerization, in-situ polymerization and coacervation, and may preferably have a capsule size which is substantially equal to the size of the hollows 3i. As materials for forming the microcapsules 3j, the same polymer materials as those described previously may be used.

There are also no particular limitations on the method by which the microcapsules 3j are filled into the hollows 3i. They may be filled using the above nozzle of an ink jet system.

With regard to the electrophoretic particles 3d and dispersion medium 3e, the same particles and dispersion medium as those described previously may be used.

After the fluid dispersion comprised of the electrophoretic particles 3d and the dispersion medium 3e has been filled into the hollows 3i defined by the conductive partition walls 3f, these are covered with the second substrate 3b, and the edge space between the first substrate 3a and the second substrate 3b is sealed with the adhesive 3h. (See FIG. 8E.)

In the case of the electrophoretic display element making use of microcapsules, after the microcapsules 3j having enveloped the fluid dispersion comprised of the electrophoretic particles 3d and the dispersion medium 3e have been filled into the hollows 3i defined by the conductive partition walls 3f, these are covered with the second substrate 3b, and the edge space between the first substrate 3a and the second substrate 3b is sealed with the adhesive 3h. (See FIG. 8F.)

As the second substrate 3b, one made of the same materials as that of the first substrate 3a may be used. As the adhesive 3h, the adhesive described previously may be used.

The display is performed by applying voltage across the first electrodes 3c and the conductive partition walls 3f. In this case, the conductive partition walls 3f are used as common electrodes.

Figure 8G:
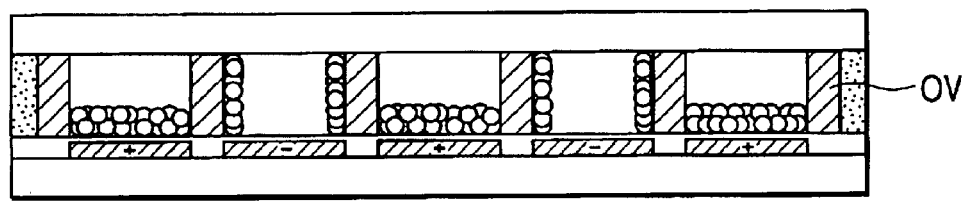
Figure 8H:
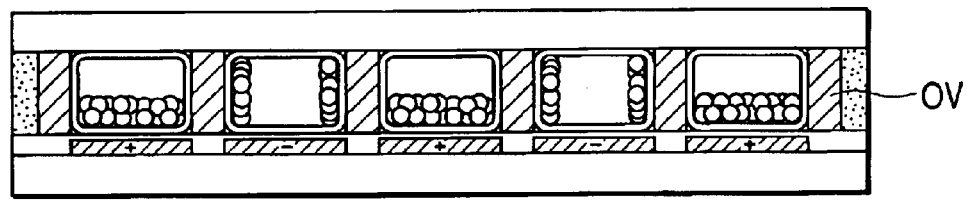

For example, when white electrophoretic particles charged negatively and a colorless and transparent dispersion medium are used and the top of the first electrodes 3c is black, a white image can be displayed when the electrophoretic particles are collected on the first electrodes 3c, and a black image can be displayed when collected on the conductive partition walls 3f (See FIGS. 8G and 8H.)

As another example of the display, when white electrophoretic particles charged positively, black electrophoretic particles charged negatively and a colorless and transparent dispersion medium are used, a white image can be displayed when the white electrophoretic particles are collected on the first electrodes 3c, and a black image can be displayed when the black electrophoretic particles are collected on the first electrodes 3c. In this case, the first electrodes need not be black. (See FIGS. 8I and 8J.)

The voltage to be applied may differ depending on the charge quantity of the electrophoretic particles and the distance between the electrodes. Usually, a voltage of 10 V to tens of volts is necessary.

In the display element having this construction, the conductive partition walls formed of the self-assembling material can simply be formed on the substrate in a minute thickness and at specific positions on the substrate. Hence, a display element which can perform highly minute display can be simply manufactured.

A further embodiment of the display element of the present invention is described below.

Figure 10:
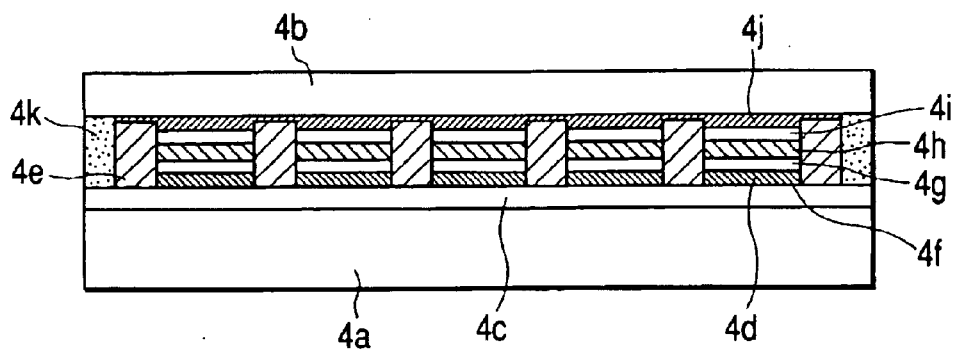
FIG. 10 is a sectional view showing an embodiment of an organic EL display element according to the present invention.

FIG. 10 is a sectional view showing an embodiment of an organic EL display element according to the present invention. As shown in FIG. 10, the organic EL display element of the present invention has a first substrate 4a having an insulating layer 4c and hydrophilic areas 4d and, formed at desired positions on it, partition walls 4e formed by self-assembly of the self-assembling material. Hollows 4f are defined by the first substrate 4a and partition walls 4c and are arranged in a honeycomb fashion in a planar view. In the hollows 4f, first electrodes 4g, organic EL mediums 4h, second electrodes 4i and a cover electrode 4j are formed in order, and these are covered with a second substrate 4b. The edge space between the first substrate 4a and the second substrate 4b is sealed with an adhesive 4k.

In the display element shown in FIG. 10, the first electrodes 4g are pixel electrodes which can apply desired electric fields independently to the organic EL mediums 4h held in the individual hollows 4f, and the second electrodes 4i are opposing electrodes. These pixel electrodes are provided with switching elements. Selective signals are applied to individual row electrodes from a matrix drive circuit (not shown), and control signals and outputs from a drive transistor are further applied to column electrodes. Thus, desired electric fields can be applied to the organic EL mediums 4h held in the individual hollows 4f. The organic EL mediums 4h held in the individual hollows 4f are controlled by the electric fields applied through the first electrodes 4g, and each pixel displays a color in which the organic EL mediums 4h emit light.

A process for manufacturing the display element of this embodiment is described below with reference to FIGS. 11A to 11D.

FIGS. 11A to 11D present a flow sheet showing an example of the process for manufacturing an organic EL display element according to the present invention.

First, the insulating layer 4c is formed on the first substrate 4a. Next, on the insulating layer 4c, hydrophilic areas 4d are formed patternwise in a honeycomb fashion in circles, each having a desired diameter, and at the positions where the hollows 4f are to be provided to provide on the insulating layer 4c a pattern of areas having different surface energy. (See FIG. 11A.)

The first substrate 4a is any desired insulating member which supports the organic EL display element, and glass or plastic may be used.

The insulating layer 4c may be formed using a colorless and transparent insulating resin. For example, as described previously, any of acrylic resins, epoxy resins, fluorine resins, silicone resins, polyimide resins, polystyrene resins and polyalkene resins may be used.

Next, as described above, on the insulating layer 4c, the hydrophilic areas 4d are formed patternwise in a honeycomb fashion in circles, each having a desired diameter, and at the positions where the hollows 4f are to be provided to provide on the insulating layer 4c a pattern of areas having different surface energy. In such a case, the portion where the pattern of the hydrophilic areas 4d has not been formed comes to be a hydrophobic area. The hydrophilic areas 4d on the insulating layer 4c can be provided by the patternwise formation of a hydrophilic polymer. The hydrophilic polymer described previously may be used alone or in the form of a mixture. In the pattern formation of the hydrophilic areas 4d, a printing process or photolithography may be used as described previously.

On the first substrate 4a on which the pattern of areas having different surface energy has been formed, partition walls 4e where hollows 4f are arranged in a honeycomb fashion are formed by self-assembly of the self-assembling material. (See FIG. 11B.)

The self-assembling material which forms the partition walls 4e where hollows 4f are arranged in a honeycomb fashion may include the block copolymers, homopolymers, polyion complexes, and organic and/or inorganic hybrid materials described previously. The partition walls 4e shown in FIGS. 12A and 12B may be obtained by the same method described previously. FIG. 12B is a sectional view along the line 12B—12B in FIG. 12A.

When the display element is used as the organic EL display element described above, the hollows 4f correspond to the size of hydrophilic areas 4d. The hollows 4f may each have a hollow diameter R of from 10 μm to 150 μm, and preferably from 30 μm to 100 μm, and a partition wall 4e height L of from 0.1 μm to 5 μm, having an aspect ratio (L/L') of from 0.1 to 10, and maybe arranged at intervals R1 between hollows of from 10 μm to 155 μm, and preferably from 30 μm to 105 μm.

In the hollows 4f defined by the partition walls 4e, the first electrodes 4g, the organic EL mediums 4h, the second electrodes 4i and the cover electrode 4j are formed in order. (See FIG. 11C.)

As the first electrodes 4g, transparent electrodes formed of ITO or the like may usually be used. As material for the second electrodes 4i, conductive materials having a low work function, such as Mg or Mg alloys, are used. The cover electrode 4j is so formed as to cover the second electrodes 4i, and Al or the like may be used as a material therefor, which prevents oxidation of the second electrodes 4i. Vacuum deposition may be used as a process for forming these electrodes on the substrate.

As organic EL materials, known materials capable of emitting light of R, G and B may be used. In thin film formation, vacuum deposition or an ink jet process may be used. In the ink jet process, the organic EL materials or precursors thereof are each dissolved or dispersed in a liquid to prepare an ejection fluid. The ejection fluid is ejected into the hollows 4f by the ink jet process, followed by heating or irradiation by light to form films.

Next, the face side where the partition walls 4e and the organic EL mediums 4h are formed is covered with the second substrate 4b, and the edge space between the first substrate 4a and the second substrate 4b is sealed with the adhesive 4k. At the same time, an inert gas is filled into the hollow internal spaces formed by the first substrate 4a, adhesive 4k and second substrate 4b to keep any moisture or oxygen from coming from the outside. Thus, the display element is made. (See FIG. 11D.)

As materials for the second substrate 4b, the same materials as those for the first substrate 4a may be used.

As the adhesive 4k, there are no particular limitations thereon as long as it can retain an adhesive effect over a long period of time. For example, any of epoxy resins, acrylic resins, urethane resins, vinyl acetate resins, phenolic resins, polyester resins, polybutadiene resins and silicone resins may be used alone or in a combination of two or more types.

Electric fields are applied across the first electrodes 4g and the second electrodes 4i of the organic EL display element according to the present invention, whereupon the organic EL mediums 4h emit light to perform display through the first substrate 4a.

In the display element having this construction, the partition walls can be simply formed on the substrate in a minute thickness and at specific positions on the substrate by self-assembly of the self-assembling material. Hence, a display element which can perform highly minute display can be simply manufactured.

Examples of the present invention are given below.

EXAMPLE 1

The electrophoretic display element shown in FIG. 1A was manufactured according to the manufacturing process shown in FIGS. 2A to 2J.

First, as first electrodes 1c for controlling the fluid dispersion, an aluminum film (0.2 $\mu$m thick) was formed on a first substrate 1a made of glass (1 mm thick), and then the electrodes were formed patternwise by photolithography in circles, each having a diameter of 80 $\mu$m, and also in a honeycomb fashion. Here, the electrodes were formed in an electrode-to-electrode distance (distance between the centers of adjoining electrodes) of 82 $\mu$m. On these electrodes, an insulating layer 1h (1 $\mu$m thick) was formed using an acrylic resin.

Using as a photosensitive agent an aqueous solution containing polyvinyl alcohol and ammonium dichromate, hydrophilic areas 1m (0.2 $\mu$m thick) were formed patternwise by photolithography in circles, each having a diameter of 80 $\mu$m, and at the positions right over the first electrodes 1c to provide on the insulating layer 1h a pattern of areas having different surface energy.

Partition walls 1g where hollows 1k were arranged in a honeycomb fashion were formed at desired positions on the first substrate 1a as shown in FIGS. 3A and 3B by self-assembly of a block copolymer represented by the following chemical formula (II) (m=590, n=385, Mw/Mn<1.05). As conditions for forming the partition walls 1g, a carbon disulfide solution of the block copolymer represented by the chemical formula (II) (concentration: 3% by weight) was cast over the first substrate 1a under 90% humidity, and the organic solvent was made to evaporate gradually to form the partition walls. The hollow diameter of the hollows and the wall height of the partition walls were 80 $\mu$m and 50 $\mu$m, respectively, and the aspect ratio was 25. The interval R1 between hollows was 82 $\mu$m.

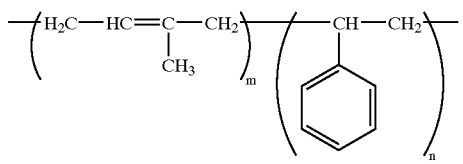
(II)

As a dispersion medium 1f, ISOPER H (trade name; available from Exon Chemical Co.) was used, and 0.5% by weight of a blue dye (Oil Blue N, Aldrich) was added to color the dispersion medium 1f in blue. Then, 9% by weight of white particles (titanium oxide; average particle diameter: 0.2 $\mu$m) as electrophoretic particles 1e and 0.25% by weight of zirconium octanoate (available from Nippon Chemical Industrial Co., Ltd.) as a charging agent were added to the dispersion medium 1f to make up a fluid dispersion.

Next, using a nozzle of an ink jet system, the fluid dispersion was filled into the hollows 1k. Thereafter, the top surfaces of the partition walls 1g were covered with a second substrate 1b, and the edge space between the first substrate 1a and the second substrate 1b was sealed with an adhesive 1j. A glass substrate (1 mm thick) was used as the second substrate 1b, on which an ITO film (0.1 $\mu$m thick) as a second electrode 1d and a colorless and transparent acrylic resin film (1 $\mu$m thick) as an insulating layer 1i had been formed in order. Also, as the adhesive 1j, an epoxy resin was used. Energizing circuits were connected to the first electrodes 1c and the second electrode 1d to obtain a display element.

Display was performed by applying voltage across the electrodes. The display element was driven at an applied voltage of a 15 V, whereupon, as shown in FIG. 2G, highly minute display in blue and white was performable by up-and-down drive of the electrophoretic particles 1e in each pixel.

EXAMPLE 2

The electrophoretic display element shown in FIG. 1A was manufactured according to the manufacturing process shown in FIGS. 2A to 2J.

First electrodes 1c, an insulating layer 1h and hydrophilic areas 1m were formed on a first substrate 1a in the same manner as in Example 1. In this example, the first electrodes 1c and the hydrophilic areas 1m were formed in circles, each having a diameter of 40 $\mu$m, and the electrodes were formed in an electrode-to-electrode distance of 41 $\mu$m.

Partition walls 1g where hollows 1k were arranged in a honeycomb fashion were formed at desired positions on the first substrate 1a as shown in FIGS. 3A and 3B by self-assembly of a rod-coil block copolymer represented by the following chemical formula (III) (m=200, n=6,000, Mw/Mn<1.05). As conditions for forming the partition walls 1g, a carbon disulfide solution of the rod-coil block copolymer represented by the chemical formula (III) (concentration: 1.5% by weight) was cast over the first substrate 1a under 80% humidity, and the organic solvent was made to evaporate gradually to form the partition walls. The hollow diameter of the hollows and the wall height of the partition walls were 40 $\mu$m and 30 $\mu$m, respectively, and the aspect ratio was 30. The interval R1 between hollows was 41 $\mu$m.

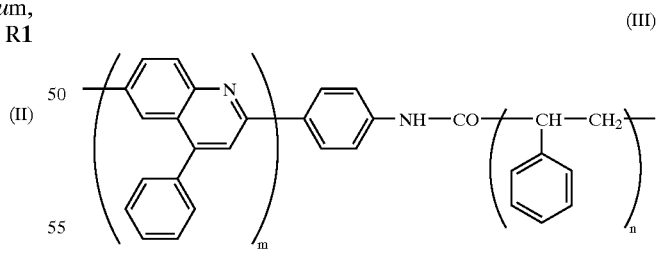
(III)

As a dispersion medium 1f, ISOPER H was used. Two types of particles having different colors and charge characteristics were used as electrophoretic particles 1e. That is, 9% by weight of white particles (titanium oxide; average particle diameter: 0.2 $\mu$m) and 8% by weight of black particles (particles obtained by coating carbon particles with styrene-divinylbenzene resin; average particle diameter: 1.0 $\mu$m) were used. These and 0.5% by weight of zirconium octanoate as a charging agent were added to the dispersion medium 1f to make up a fluid dispersion.

Next, using a nozzle of an ink jet system, the fluid dispersion was filled into the hollows 1k. Thereafter, the top surfaces of the partition walls 1g were covered with a second substrate 1b, and the edge space between the first substrate 1a and the second substrate 1b was sealed with an adhesive 1j. As the second substrate 1b having a second electrode 1d and an insulating layer 1i and as the adhesive 1j, the same ones as those in Example 1 were used. Energizing circuits were connected to the first electrodes 1c and the second electrode 1d to obtain a display element.

Display was performed by applying voltage across the electrodes. The display element was driven at an applied voltage of 15 V, whereupon, as shown in FIG. 2I, highly minute display in black and white was performable by up-and-down drive of the two types of electrophoretic particles in each pixel.

EXAMPLE 3

The electrophoretic display element shown in FIG. 1B was manufactured according to the manufacturing process shown in FIGS. 2A to 2J.

On a first substrate 1a formed of a PET film (300 μm thick), first electrodes 1c, an insulating layer 1h and hydrophilic areas 1m were formed in the same manner as in Example 1. In this example, the first electrodes 1c and the hydrophilic areas 1m were formed in circles, each having a diameter of 70 μm, and the electrodes were formed in an electrode-to-electrode distance of 71.5 μm.

Partition walls 1g where hollows 1k were arranged in a honeycomb fashion were formed at desired positions on the first substrate 1a as shown in FIGS. 3A and 3B by self-assembly of a polyion complex represented by the following chemical formula (IV) (n=330, Mw/Mn<1.05). As conditions for forming the partition walls 1g, a chloroform solution of the polyion complex represented by the chemical formula (IV) (concentration: 3% by weight) was cast over the first substrate 1a under 85% humidity, and the organic solvent was made to evaporate gradually to form the partition walls. The hollow diameter of the hollows and the wall height of the partition walls were 70 μm and 45 μm, respectively, and the aspect ratio was 30. The interval R1 between hollows was 71.5 μm.

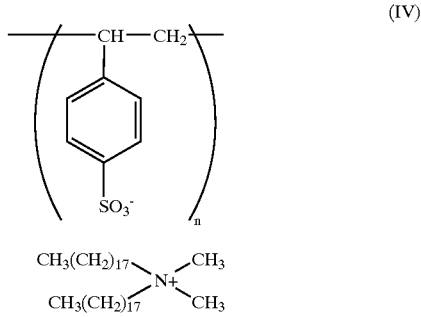

(IV)

As a dispersion medium 1f, the same one colored with a blue dye as in Example 1 was used. Then, 9% by weight of white particles (titanium oxide; average particle diameter: 0.2 μm) as electrophoretic particles 1e and 0.25% by weight of OLOA (trade name; available from Chevron Corp.) as a charging agent were added to the dispersion medium 1f to make up a fluid dispersion.

Microcapsules 1l having enveloped the fluid dispersion were produced by in-situ polymerization, followed by classification to obtain microcapsules 1l having a particle diameter of 65 to 70 μm. Urea-formaldehyde resin was used as a film material.

Next, using a nozzle of an ink jet system, the microcapsules 1l were filled into the hollows 1k. Thereafter, the top surfaces of the partition walls 1g were covered with a second substrate 1b, and the edge space between the first substrate 1a and the second substrate 1b was sealed with an adhesive 1j. A PET (polyethylene terephthalate) film (120 μm thick) was used as the second substrate 1b, on which an ITO film (0.1 μm thick) as a second electrode 1d and a colorless and transparent acrylic resin film (1 μm thick) as an insulating layer 1i had been formed in order. Also, as the adhesive 1j, an epoxy resin was used. Energizing circuits were connected to the first electrodes 1c and the second electrode 1d to obtain a display element.

Display was performed by applying voltage across the electrodes. The display element was driven at an applied voltage of ±15 V, whereupon, as shown in FIG. 2H, highly minute display in blue and white was performable by up-and-down drive of the electrophoretic particles in each pixel.

EXAMPLE 4

The electrophoretic display element shown in FIG. 1B was manufactured according to the manufacturing process shown in FIGS. 2A to 2J.

First electrodes 1c, an insulating layer 1h and hydrophilic areas 1m were formed on a first substrate 1a in the same manner as in Example 3. In this example, the first electrodes 1c and the hydrophilic areas 1m were formed in circles, each having a diameter of 45 μm, and the electrodes were formed in an electrode-to-electrode distance of 46.2 μm.

Partition walls 1g where hollows 1k were arranged in a honeycomb fashion were formed at desired positions on the first substrate 1a as shown in FIGS. 3A and 3B by self-assembly of an organic/inorganic hybrid material represented by the following chemical formula (V) (molar ratio: 3:1). As conditions for forming the partition walls 1g, a carbon disulfide solution of the organic/inorganic hybrid material represented by the chemical formula (V) (concentration: 1% by weight) was cast over the first substrate 1a under 80% humidity, and the organic solvent was made to evaporate gradually to form the partition walls. The hollow diameter of the hollows and the wall height of the partition walls were 45 μm and 30 μm, respectively, and the aspect ratio was 25. The interval R1 between hollows was 46.2 μm.

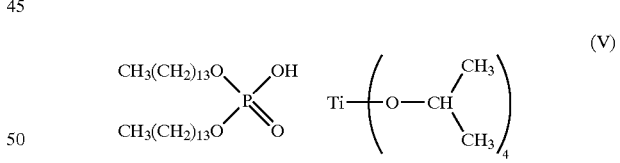

(V)

As a dispersion medium 1f, ISOPER H was used. Two types of particles having different colors and charge characteristics were used as electrophoretic particles 1e. That is, 9% by weight of white particles (titanium oxide; average particle diameter: 0.2 μm) and 8% by weight of black particles (particles obtained by coating carbon particles with styrene-divinylberzene resin; average particle diameter: 1.0 μm) were used. These and 0.5% by weight of OLOA as a charging agent were added to the dispersion medium 1f to make up a fluid dispersion.

Microcapsules 1l having enveloped the fluid dispersion were produced by interfacial polymerization, followed by classification to obtain microcapsules 1l having a particle diameter of 40 to 45 μm. Urethane resin was used as a film material.

Next, using a nozzle of an ink jet system, the microcapsules 1*l* were filled into the hollows 1*k*. Thereafter, the top surfaces of the partition walls 1*g* were covered with a second substrate 1*b*, and the edge space between the first substrate 1*a* and the second substrate 1*b* was sealed with an adhesive 1*j*. As the second substrate 1*b* having a second electrode 1*d* and an insulating layer 1*i* and as the adhesive 1*j*, the same ones as those in Example 3 were used. Energizing circuits were connected to the first electrodes 1*c* and the second electrode 1*d* to obtain a display element.

Display was performed by applying voltage across the electrodes. The display element was driven at an applied voltage of ±15 V, whereupon, as shown in FIG. 2J, highly minute display in black and white was performable by up-and-down drive of the two types of electrophoretic particles in each pixel.

EXAMPLE 5

The electrophoretic display element shown in FIG. 4A was manufactured according to the manufacturing process shown in FIGS. 5A to 5H.

As a first electrode 1*c*, an aluminum film (0.2 $\mu$m thick) was formed on a first substrate 1*a* made of glass (1 mm thick). Next, an insulating layer 2*i* (3 $\mu$m thick) comprised of an acrylic resin mixed with fine alumina particles was formed on the first electrode 2*c*. On this insulating layer 2*i*, as second electrodes 2*d*, a black titanium carbide film (0.1 $\mu$m thick) was formed, and then the electrodes were formed patternwise by photolithography in circles, each having a diameter of 36 $\mu$m, and also in a honeycomb fashion. On the second electrodes 2*d*, a colorless and transparent insulating layer 2*j* (1 $\mu$m thick) was further formed using an acrylic resin.

In the same manner as in Example 1, hydrophilic areas 2*m* were formed patternwise on the concentric circles of the second electrodes 2*d* in circles, each having a diameter of 75 $\mu$m, to provide on the insulating layer 2*j* a pattern of areas having different surface energy. The hydrophilic areas 2*m* were formed in a thickness of 0.2 $\mu$m and a hydrophilic area-to-area distance (distance between the centers of adjoining hydrophilic areas) of 77 $\mu$m.

Figure 6A:
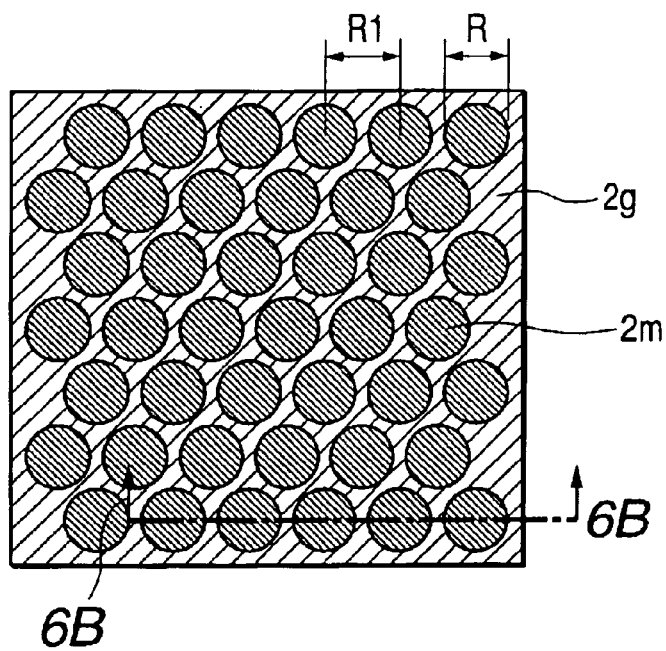
FIGS. 6A and 6B are schematic views of partition walls having a structure in which the hollows are arranged in a honeycomb fashion.
Figure 6B:
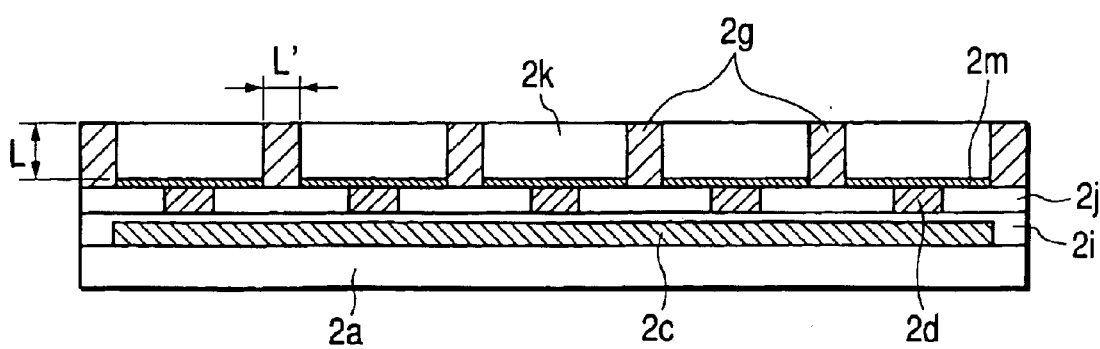

Partition walls 2*g* where hollows 2*k* were arranged in a honeycomb fashion were formed at desired positions on the first substrate 2*a* as shown in FIGS. 6A and 6B by self-assembly of a rod-coil block copolymer represented by the following chemical formula (VI) (m=400, n=900, Mw/Mn<1.05). As conditions for forming the partition walls 2*g*, a carbon disulfide solution of the rod-coil block copolymer represented by the chemical formula (VI) (concentration: 3% by weight) was cast over the first substrate 2*a* under 80% humidity, and the organic solvent was made to evaporate gradually to form the partition walls. The hollow diameter of the hollows and the wall height of the partition walls were 75 $\mu$m and 45 $\mu$m, respectively, and the aspect ratio was 22.5. The interval R1 between hollows was 77 $\mu$m.

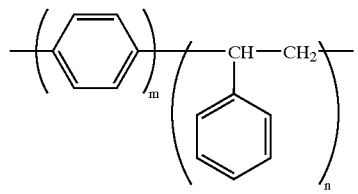

(VI)

As a dispersion medium 2*f*, ISOPER H was used. Then, 3% by weight of black particles (particles obtained by coating carbon particles with styrene-divinylbenzene resin; average particle diameter: 1.0 $\mu$m) as electrophoretic particles 2*e* and 0.09% by weight of zirconium octanoate as a charging agent were added to the dispersion medium 2*f* to make up a fluid dispersion.

Next, using a nozzle of an ink jet system, the fluid dispersion was filled into the hollows 2*k*. Thereafter, the top surfaces of the partition walls 2*g* were covered with a second substrate 2*b*, and the edge space between the first substrate 2*a* and the second substrate 2*b* was sealed with an adhesive 2*h*. As the second substrate 2*b*, the same one as the first substrate 2*a* was used. As the adhesive 2*h*, a urethane resin was used. Energizing circuits were connected to the first electrode 2*c* and the second electrodes 2*d* to obtain a display element.

Figure 5G:
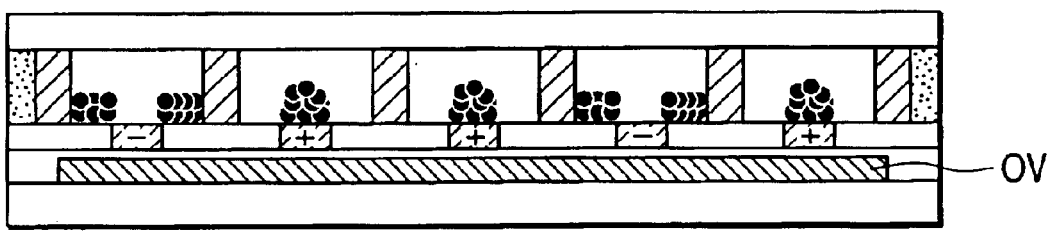

Display was performed by applying voltage across the electrodes. The display element was driven at an applied voltage of ±20 V, whereupon, as shown in FIG. 5G, highly minute display in black and white was performable by horizontal drive of the electrophoretic particles in each pixel.

EXAMPLE 6

The electrophoretic display element shown in FIG. 4A was manufactured according to the manufacturing process shown in FIGS. 5A to 5H.

A first electrode 2*c*, an insulating layer 2*i*, second electrodes 2*d*, an insulating layer 2*j* and hydrophilic areas 2*m* were formed in order on a first substrate 2*a* in the same manner as in Example 5. In this example, the second electrodes 2*d* were formed in circles each having a diameter of 22 $\mu$m, and the hydrophilic areas 2*m* were formed patternwise on the concentric circles of the second electrodes 2*d* in circles, each having a diameter of 45 $\mu$m, and in a thickness of 0.2 $\mu$m and a hydrophilic area-to-area distance of 46 $\mu$m.

Partition walls 2*g* where hollows 2*k* were arranged in a honeycomb fashion were formed at desired positions on the first substrate 2*a* as shown in FIGS. 6A and 6B by self-assembly of a block copolymer represented by the following chemical formula (II) (m=590, n=385, Mw/Mn<1.05). As conditions for forming the partition walls 2*g*, a carbon disulfide solution of the block copolymer represented by the chemical formula (II) (concentration: 1% by weight) was cast over the first substrate 2*a* under 80% humidity, and the organic solvent was made to evaporate gradually to form the partition walls. The hollow diameter of the hollows and the wall height of the partition walls were 45 $\mu$m and 35 $\mu$m, respectively, and the aspect ratio was 35. The interval R1 between hollows was 46 $\mu$m.

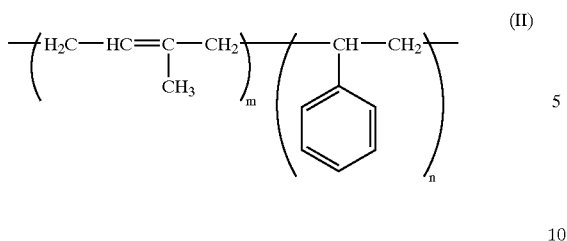 (II)

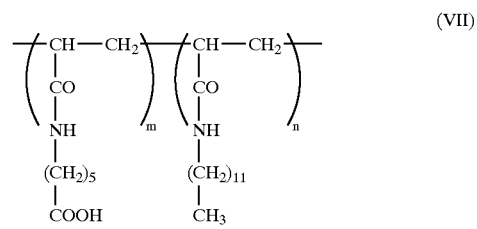 (VII)

As a fluid dispersion comprised of electrophoretic particles 2e and a dispersion medium 2f, the same one as in Example 5 was used. Using a nozzle of an ink jet system, the fluid dispersion was filled into the hollows 2k. Thereafter, the top surfaces of the partition walls 2g were covered with a second substrate 2b, and the edge space between the first substrate 2a and the second substrate 2b was sealed with an adhesive 2h. As the second substrate 2b and the adhesive 2h, the same ones as in Example 5 were used. Energizing circuits were connected to the first electrode 2c and the second electrodes 2d to obtain a display element.

Display was performed by applying voltage across the electrodes. The display element was driven at an applied voltage of ±20 V, whereupon, as shown in FIG. 5G, highly minute display in black and white was performable by horizontal drive of the electrophoretic particles in each pixel.

EXAMPLE 7

The electrophoretic display element shown in FIG. 4B was manufactured according to the manufacturing process shown in FIGS. 5A to 5H.

On a first substrate 2a formed of a PET film (300 μm thick), a first electrode 2c, an insulating layer 2i, second electrodes 2d, an insulating layer 2j and hydrophilic areas 2m were formed in order in the same manner as in Example 5. In this example, the second electrodes 2d were formed in circles, each having a diameter of 30 μm, and the hydrophilic areas 2m were formed patternwise on the concentric circles of the second electrodes 2d in circles, each having a diameter of 60 μm, and in a thickness of 0.2 μm and a hydrophilic area-to-area distance of 61.6 μm Partition walls 2g where hollows 2k were arranged in a honeycomb fashion were formed at desired positions on the first substrate 2a as shown in FIGS. 6A and 6B by self-assembly of polystyrene (molecular weight Mn=90,000, Mw/Mn<1.05). As conditions for forming the partition walls 2g, a methylene chloride solution of the polystyrene (concentration: 2% by weight) and a benzene solution of a surface active agent represented by the following chemical formula (VII) (concentration: 0.2% by weight) were mixed in a weight ratio of 9:1; then the mixture obtained was cast over the first substrate 2a under 85% humidity, and the organic solvent was made to evaporate gradually to form the partition walls. The hollow diameter of the hollows and the wall height of the partition walls were 60 μm and 40 μm, respectively, and the aspect ratio was 25. The interval R1 between hollows was 61.6 μm.

As a fluid dispersion comprised of electrophoretic particles 2e and a dispersion medium 2f, the same one as in Example 5 was used. Microcapsules 2l having enveloped the fluid dispersion were produced by coacervation, followed by classification to obtain microcapsules 2l having a particle diameter of 55 to 60 μm. Gelatin was used as a film material.

Using a nozzle of an ink jet system, the microcapsules 2l were filled into the hollows 2k. Thereafter, the top surfaces of the partition walls 2g were covered with a second substrate 2b, and the edge space between the first substrate 2a and the second substrate 2b was sealed with an adhesive 2h. A PET film (120 μm thick) was used as the second substrate 2b. As the adhesive 2h, a polyester resin was used. Energizing circuits were connected to the first electrode 2c and the second electrodes 2d to obtain a display element.

Figure 5H:
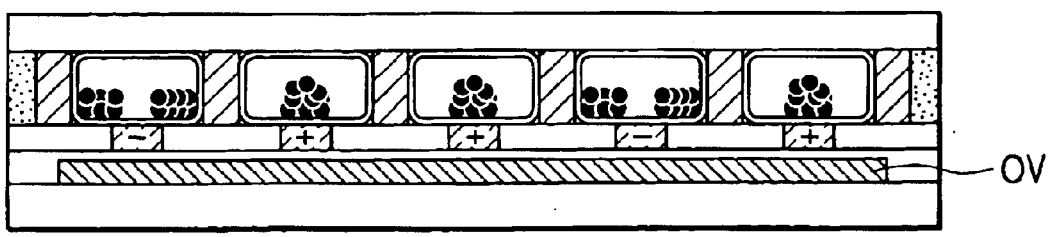

Display was performed by applying voltage across the electrodes. The display element was driven at an applied voltage of ±20 V, whereupon, as shown in FIG. 5H, highly minute display in black and white was performable by horizontal drive of the electrophoretic particles in each pixel.

EXAMPLE 8

The electrophoretic display element shown in FIG. 4B was manufactured according to the manufacturing process shown in FIGS. 5A to 5H.

A first substrate 2a having a first electrode 2c, an insulating layer 2i, second electrodes 2d, an insulating layer 2j and hydrophilic areas 2m, was prepared in the same manner as in Example 7. In this example, the second electrodes 2d were formed in circles, each having a diameter of 20 μm, and the hydrophilic areas 2m were formed patternwise on the concentric circles of the second electrodes 2d in circles each having a diameter of 40 μm, and in a thickness of 0.2 μm and a hydrophilic area-to-area distance of 41 μm.

Partition walls 2g where hollows 2k were arranged in a honeycomb fashion were formed at desired positions on the first substrate 2a as shown in FIGS. 6A and 6B by self-assembly of a rod-coil block copolymer represented by the following chemical formula (E) (m=100, n=4,000, Mw/Mn<1.05). As conditions for forming the partition walls 2g, a carbon disulfide solution of the rod-coil block copolymer represented by the chemical formula (III) (concentration: 1.5% by weight) was cast over the first substrate 2a under 75% humidity, and the organic solvent was made to evaporate gradually to form the partition walls. The hollow diameter of the hollows and the wall height of the partition walls were 40 μm and 30 μm, respectively, and the aspect ratio was 30. The interval R1 between hollows was 41 μm.

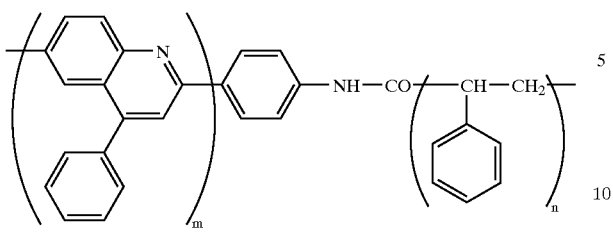

(III)

As a fluid dispersion comprised of electrophoretic particles 2e and a dispersion medium 2f, the same one as in Example 5 was used. Microcapsules 2l having enveloped the fluid dispersion were produced by interfacial polymerization, followed by classification to obtain microcapsules 2l having a particle diameter of 35 to 40 $\mu$m. Polyamide was used as a film material.

Using a nozzle of an ink jet system, the microcapsules 2l were filled into the hollows 2k. Thereafter, the top surfaces of the partition walls 2g were covered with a second substrate 2b, and the edge space between the first substrate 2a and the second substrate 2b was sealed with an adhesive 2h. As the second substrate 2b and the adhesive 2h, the same ones as in Example 7 were used. Energizing circuits were connected to the first electrode 2c and the second electrodes 2d to obtain a display element.

Display was performed by applying voltage across the electrodes. The display element was driven at an applied voltage of ±20 V, whereupon, as shown in FIG. 5H, highly minute display in black and white was performable by horizontal drive of the electrophoretic particles in each pixel.

EXAMPLE 9

The electrophoretic display element shown in FIG. 7A was manufactured according to the manufacturing process shown in FIGS. 8A to 8J.

First, as first electrodes 3c, a black titanium carbide film (0.1 $\mu$m thick) was formed on a first substrate 3a made of glass (1 mm thick), and then the electrodes were formed patternwise by photolithography in circles, each having a diameter of 40 $\mu$m, and also in a honeycomb fashion. Here, the electrodes were formed in an electrode-to-electrode distance of 41 $\mu$m. On the first electrodes 3c, a colorless and transparent insulating layer 3g (1 $\mu$m thick) was foamed using an acrylic resin.

Next, in the same manner as in Example 1, hydrophilic areas 3k (0.2 $\mu$m thick) were formed patternwise by photolithography in circles, each having a diameter of 40 $\mu$m, at the positions right over the first electrodes 3c to provide on the insulating layer 3g a pattern of areas having different surface energy.

Conductive partition walls 3f where hollows 3i were arranged in a honeycomb fashion were formed at desired positions on the first substrate 3a as shown in FIGS. 9A and 9B by self-assembly of a polypyrrole represented by the following chemical formula (VIE) (molecular weight Mn=60,000, Mw/Mn<1.05). As conditions for forming the conductive partition walls 3f, a chloroform solution of the polypyrrole (concentration: 1.5% by weight) and a benzene solution of a surface active agent represented by the following chemical formula (VII) (concentration: 0.2% by weight) were mixed in a weight ratio of 10:1; then the mixture obtained was cast over the first substrate 3a under 75% humidity, and the organic solvent was made to evaporate gradually to form the partition walls. Next, the conductive partition walls 3f were exposed to a dopant gas in order to improve conductivity.

The hollow diameter of the hollows and the wall height of the partition walls were 40 $\mu$m and 30 $\mu$m, respectively, and the aspect ratio was 30. The interval R1 between hollows was 41 $\mu$m.

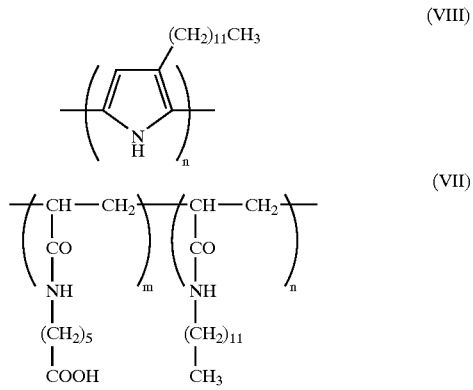

(VIII)

(VII)

As a dispersion medium 3e, ISOPER H was used. Then, 5% by weight of white particles (titanium oxide; average particle diameter: 0.2 $\mu$m) as electrophoretic particles 3d and 0.15% by weight of OLOA as a charging agent were added to the dispersion medium 3e to make up a fluid dispersion.

Next, using a nozzle of an ink jet system, the fluid dispersion was filled into the hollows 3i. Thereafter, the top surfaces of the conductive partition walls 3f were covered with a second substrate 3b, and the edge space between the first substrate 3a and the second substrate 3b was sealed with an adhesive 3h. As the second substrate 3b, the same one as the first substrate 3a was used. As the adhesive 3h, a polyester resin was used. Energizing circuits were connected to the first electrodes 3c and the conductive partition walls 3f to obtain a display element.

Display was performed by applying voltage across the first electrodes 3c and the conductive partition walls 3f. The display element was driven at an applied voltage of ±20 V, whereupon, as shown in FIG. 8G, highly minute display in black and white was performable by electrophoresis of the electrophoretic particles 3d in each pixel.

EXAMPLE 10

The electrophoretic display element shown in FIG. 7A was manufactured according to the manufacturing process shown in FIGS. 8A to 8J.

First electrodes 3c, an insulating layer 3g, hydrophilic areas 3k and conductive partition walls 3f were formed on a first substrate 3a in the same manner as in Example 9.

As a dispersion medium 3e, ISOPER H was used. Two types of particles having different colors and charge characteristics were used as electrophoretic particles 3d. That is, 7% by weight of white particles (titanium oxide; average particle diameter: 0.2 $\mu$m) and 6% by weight of black particles (particles obtained by coating carbon particles with styrene-divinylbenzene resin; average particle diameter: 1.0 $\mu$m) were used. These and 0.4% by weight of zirconium octanoate as a charging agent were added to the dispersion medium 3e to make up a fluid dispersion.

Next, in the same manner as in Example 9, the fluid dispersion was filled into the hollows 3i, thereafter the top surfaces of the conductive partition walls 3f were covered with a second substrate 3b, and the edge space between the first substrate 3a and the second substrate 3b was sealed with an adhesive 3h. Energizing circuits were connected to the first electrodes 3c and the conductive partition walls 3f to obtain a display element.

Figure 8I:
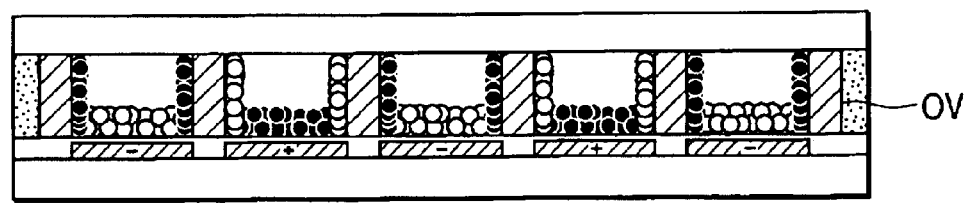

Display was performed by applying voltage across the first electrodes 3c and the conductive partition walls 3f. The display element was driven at an applied voltage of ±20 V, whereupon, as shown in FIG. 8I, highly minute display in black and white was performable by electrophoresis of the two types of electrophoretic particles 3d in each pixel.

EXAMPLE 10

The electrophoretic display element shown in FIG. 7B was manufactured according to the manufacturing process shown in FIGS. 8A to 8J.

On a first substrate 3a formed of a PET film (300 μm thick), first electrodes 3c, an insulating layer 3g and hydrophilic areas 3k were formed in the same manner as in Example 9. In this example, the first electrodes 3c and the hydrophilic areas 3k were formed in circles, each having a diameter of 60 μm, and the electrodes were formed in an electrode-to-electrode distance of 61 μm.

Conductive partition walls 3f where hollows 3i were arranged in a honeycomb fashion were formed at desired positions on the first substrate 3a as shown in FIGS. 9A and 9B by self-assembly of a polythiophene represented by the following chemical formula (IX) (molecular weight Mn=50,000, Mw/Mn<1.05). As conditions for forming the conductive partition walls 3f, a chloroform solution of the polythiophene (concentration: 1.2% by weight) and a benzene solution of a surface active agent represented by the following chemical formula (VII) (concentration: 0.2% by weight) were mixed in a weight ratio of 8:1; then the mixture obtained was casted over the first substrate 3a under 80% humidity, and the organic solvent was made to evaporate gradually to form the partition walls. Next, the conductive partition walls 3f were exposed to a dopant gas to improve their conductivity.

The hollow diameter of the hollows and the wall height of the partition walls were 60 μm and 45 μm, respectively, and the aspect ratio was 45. The interval R1 between hollows was 61 μm.

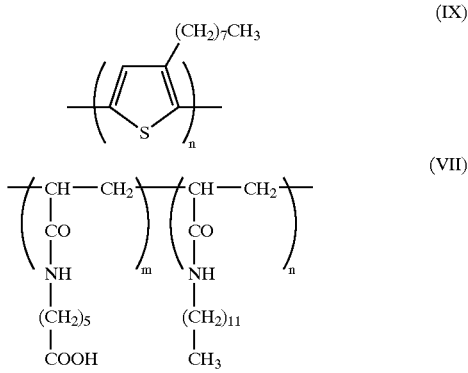

As a fluid dispersion comprised of electrophoretic particles 3d and a dispersion medium 3e, the same one as in Example 9 was used. Microcapsules 3j having enveloped the fluid dispersion were produced by interfacial polymerization, followed by classification to obtain microcapsules 3j having a particle diameter of 55 to 60 μm. Polyester was used as a film material.

Next, using a nozzle of an ink jet system, the microcapsules 3j were filled into the hollows 3k. Thereafter, the top surfaces of the conductive partition walls 3f were covered with a second substrate 3b, and the edge space between the first substrate 3a and the second substrate 3b was sealed with an adhesive 3h. A PET film (120 μm thick) was used as the second substrate 3b. As the adhesive 3h, a polyester resin was used. Energizing circuits were connected to the first electrode 3c and the conductive partition walls 3f to obtain a display element.

Display was performed by applying voltage across the first electrodes 3c and the conductive partition walls 3f The display element was driven at an applied voltage of ±20 V, whereupon, as shown in FIG. 8H, highly minute display in black and white was performable by electrophoresis of the electrophoretic particles 3d in each pixel.

EXAMPLE 12

The electrophoretic display element shown in FIG. 7B was manufactured according to the manufacturing process shown in FIGS. 8A to 8J.

First electrodes 3c, an insulating layer 3g, hydrophilic areas 3k and conductive partition walls 3f were formed on a first substrate 3a in the same manner as in Example 11.

As a fluid dispersion comprised of electrophoretic particles 3d and a dispersion medium 3e, the same one as in Example 10 was used. Microcapsules 3j having enveloped the fluid dispersion were produced by in-situ polymerization, followed by classification to obtain microcapsules 3j having a particle diameter of 55 to 60 μm. Melamine-formaldehyde resin was used as a film material.

Next, in the same manner as in Example 11, the microcapsules 3j were filled into the hollows 3i, thereafter the top surfaces of the conductive partition walls 3f were covered with a second substrate 3b, and the edge space between the first substrate 3a and the second substrate 3b was sealed with an adhesive 3h. Energizing circuits were connected to the first electrodes 3c and the conductive partition walls 3f to obtain a display element.

Figure 8J:
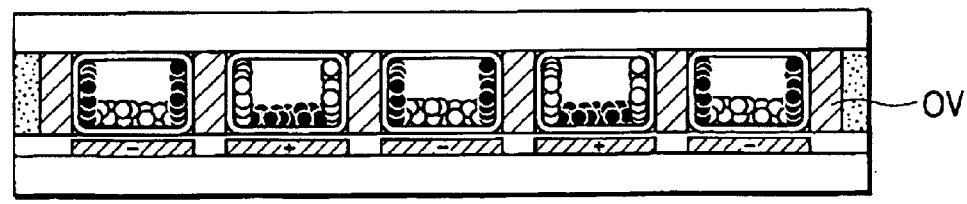

Display was performed by applying voltage across the first electrodes 3c and the conductive partition walls 3f. The display element was driven at an applied voltage of ±20 V, whereupon, as shown in FIG. 8J, highly minute display in black and white was performable by electrophoresis of the two types of electrophoretic particles 3d in each pixel.

EXAMPLE 13

The organic EL display element shown in FIG. 10 was manufactured according to the manufacturing process shown in FIGS. 11A to 11D.

A colorless and transparent insulating layer 4c (1 μm thick) was formed using an acrylic resin on a first substrate 4a made of glass (1 mm thick).

Next, in the same manner as in Example 1, hydrophilic areas 4d were formed patternwise by photolithography in circles, each having a diameter of 65 μm, and also in a honeycomb fashion to provide on the insulating layer 4c a pattern of areas having different surface energy. The hydrophilic areas 4d were formed in a thickness of 0.2 μm and a hydrophilic area-to-area distance of 66 μm.

Figure 12A:
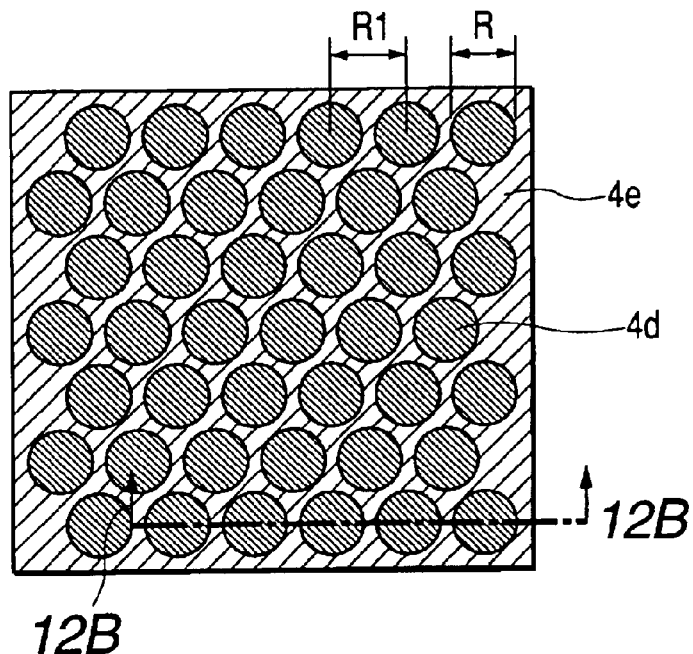
FIGS. 12A and 12B are schematic views of partition walls having a structure in which the hollows are arranged in a honeycomb fashion.
Figure 12B:
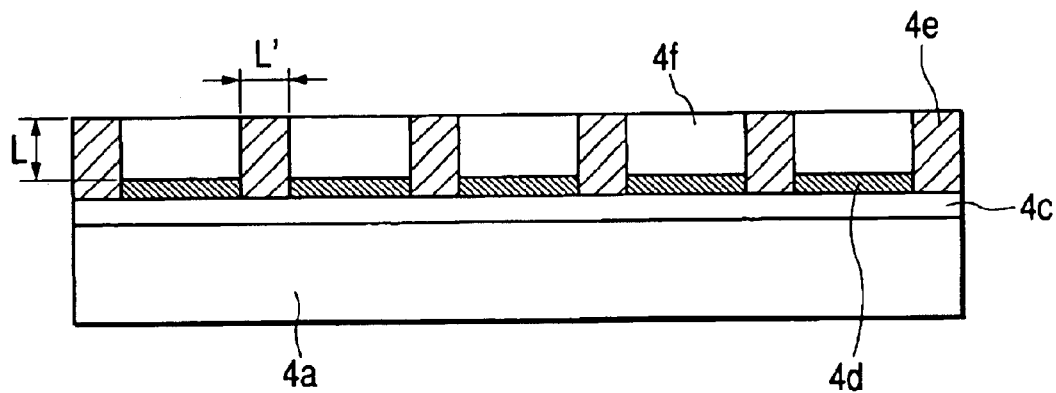
Figure 13A:
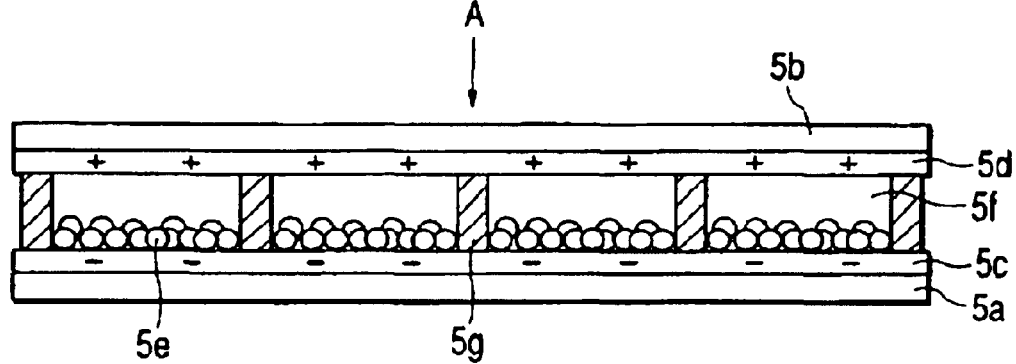
FIGS. 13A and 13B are schematic views of a conventional electrophoretic display element.
Figure 13B:
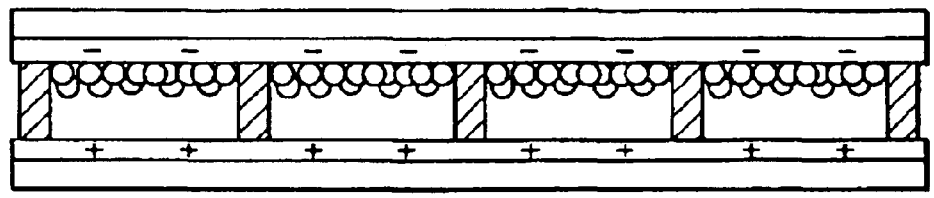
Figure 14:
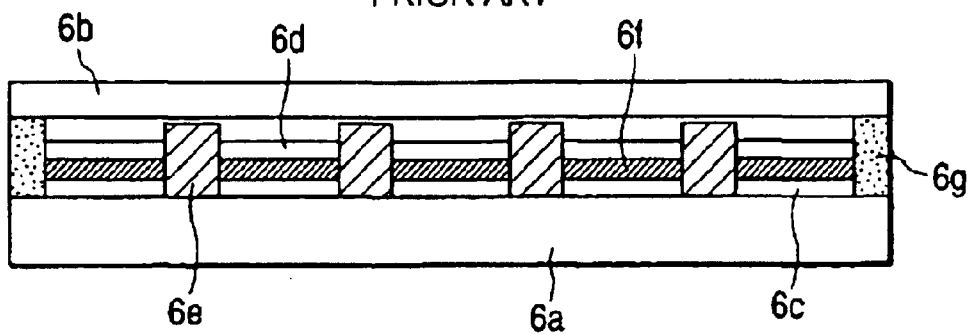
FIG. 14 is a schematic view of a conventional organic EL display element.

Partition walls 4e where hollows 4f were arranged in a honeycomb fashion were formed at desired positions on the first substrate 4a as shown in FIGS. 12A and 12B by self-assembly of a block copolymer represented by the following chemical formula (II) (m=250, n=190, Mw/Mn<1.05). As conditions for forming the partition walls 4e, a carbon disulfide solution of the block copolymer represented by the chemical formula (II) (concentration: 1.5% by weight) was cast over the first substrate 4a under 85% humidity, and the organic solvent was made to evaporate gradually to form the partition walls. The hollow diameter of the hollows and the wall height of the partition walls were 65 μm and 2 μm, respectively, and the aspect ratio was 2. The interval R1 between hollows was 66 μm.

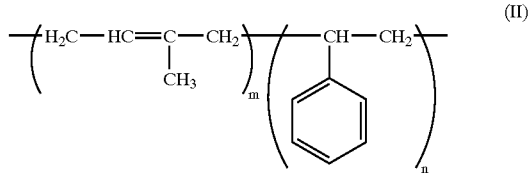

Next, in the hollows 4f on the first substrate 4a, first electrodes 4g, organic EL mediums 4h and second electrodes 4i were formed by vacuum deposition. ITO was used in the first electrodes 4g, which were formed in a thickness of 0.25 μm.

The organic EL medium 4h consisted of a hole-transport layer and an organic luminescent layer, which were formed in the order of the hole-transport layer and then the organic luminescent layer, both in a thickness of 0.5 μm. As a hole-transporting material, N,N'-biphenyl-N,N'-bis(α-naphthyl)-1,1'-biphenyl-4,4'-diamine was used. In the organic luminescent layer, three types of materials, a red luminescent material, a green luminescent material and a blue luminescent material, were used, and a red luminescent layer, a green luminescent layer and a blue luminescent layer were alternately arranged in the hollows 4f. Merocyanine, 8-quinolinol and tris(8-qunolinolato)aluminum were used as the red luminescent material, the green luminescent material and the blue luminescent material, respectively.

The second electrodes 4i were formed in a thickness of 0.3 μm using a silver-magnesium alloy.

Figure 11A:
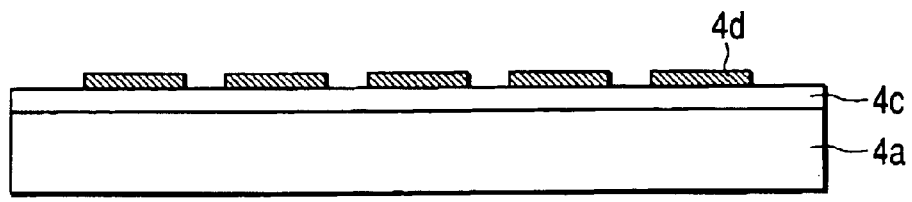
FIGS. 11A, 11B, 11C and 11D present a flow sheet showing an example of the process for manufacturing an organic EL display element according to the present invention.
Figure 11B:
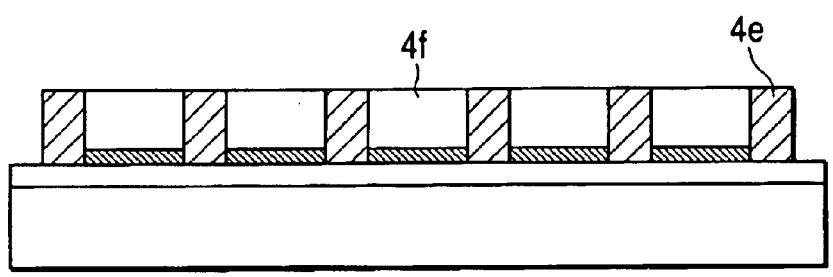
Figure 11C:
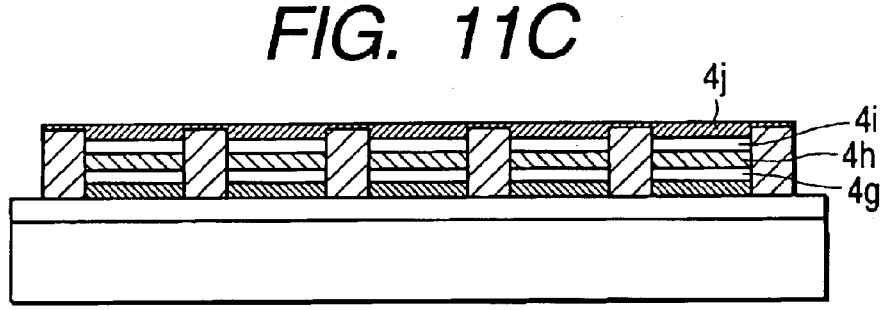
Figure 11D:
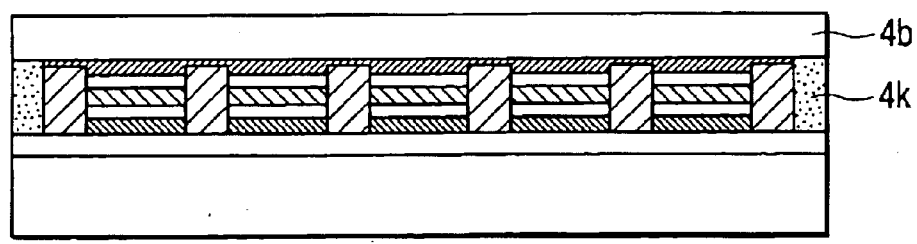

Next, as shown in FIG. 11C, aluminum was vacuum deposited on the second electrodes 4i to form a cover electrode 4j in a layer thickness of 1 μm.

Then, the face side where the partition walls 4e and the organic EL mediums 4h were formed was covered with a second substrate 4b, and the edge space between the first substrate 4a and the second substrate 4b was sealed with an adhesive 4k. At the same time, nitrogen gas was filled into the hollow internal spaces formed by the first substrate 4a, adhesive 4k and second substrate 4b to keep any moisture or oxygen from coming from the outside. Thus, the display element was made. As the second substrate 4b, the same glass substrate as the first substrate 4a was used. As the adhesive 4k, an epoxy resin was used. Then, energizing circuits were connected to the first electrodes 4g and the cover electrode 4j to obtain a display element.

Display was performed by applying voltage across the electrodes. The applied voltage was set at 10 V. Since the partition walls were provided on the substrate by self-assembly of the self-assembling material, highly minute display in full colors was performable without any intermixture of luminescent materials having different luminescent colors between pixels.

EXAMPLE 14

The organic EL display element shown in FIG. 10 was manufactured according to the manufacturing process shown in FIGS. 11A to 11D.

On a first substrate 4a formed of a PET film (300 μm thick), an insulating layer 4c and hydrophilic areas 4d were formed in the same manner as in Example 13. In this example, the hydrophilic areas 4d were formed in circles, each having a diameter of 35 μm, and in a thickness of 0.2 μm and a hydrophilic area-to-area distance of 35.5 μm.

Partition walls 4e where hollows 4f were arranged in a honeycomb fashion were formed at desired positions on the first substrate 4a as shown in FIGS. 12A and 12B by self-assembly of polystyrene (molecular weight Mn=30,000, Mw/Mn<1.05). As conditions for forming the partition walls 4e, a methylene chloride solution of the polystyrene (concentration: 1% by weight) and a benzene solution of a surface active agent represented by the following chemical formula (VII) (concentration: 0.1% by weight) were mixed in a weight ratio of 9:1; then the mixture obtained was cast over the first substrate 4a under 75% humidity, and the organic solvent was made to evaporate gradually to form the partition walls. The hollow diameter of the hollows and the wall height of the partition walls were 35 μm and 2 μm, respectively, and the aspect ratio was 4. The interval R1 between hollows was 35.5 μm.

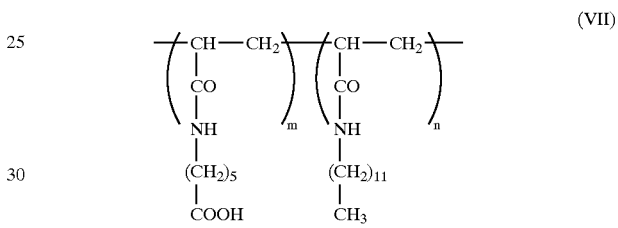

In the same manner as in Example 13, first electrodes 4g, organic EL mediums 4h and second electrodes 4i were formed in the hollows 4f on the first substrate 4a, and thereafter an aluminum layer was formed as a cover electrode 4j.

In the same manner as in Example 13, the face side where the partition walls 4e and the organic EL mediums 4h were formed was covered with a second substrate 4b, and the edge space between the first substrate 4a and the second substrate 4b was sealed with an adhesive 4k. Thus, the display element was made. As the second substrate 4b, a PET film was used like the first substrate 4a. As the adhesive 4k, an acrylic resin was used. Energizing circuits were further connected to the first electrodes 4g and the cover electrode 4j to obtain a display element.

Display was performed by applying voltage across the electrodes. The applied voltage was set at 10 V. Since the partition walls were provided on the substrate by self-assembly of the self-assembling material, highly minute display in full colors was performable without any intermixture of luminescent materials having different luminescent colors between pixels.

EXAMPLE 15

The organic EL display element shown in FIG. 10 was manufactured according to the manufacturing process shown in FIGS. 11A to 11D.

On a first substrate 4a formed of a PET film (300 μm thick), an insulating layer 4c, hydrophilic areas 4d, partition walls 4e and first electrodes 4g were formed in the same manner as in Example 14.

The organic EL medium 4h has the following construction. In red and green pixels, hole-injection-type polymeric organic luminescent layers of red and green, respectively, are formed. In blue pixels, hole-injection layers not emitting light are formed. Then, in all pixels, charge-transport-type blue luminescent layers are formed.

A red luminescent material and a green luminescent material were coated patternwise in the hollows 4f by an ink jet process to form organic luminescent layers 0.1 µm thick. As the red luminescent material, a cyanopolyphenylenevinylene was used. As the green luminescent material, a polyphenylenevinylene was used. Solutions of these polymer precursors are ink jet ejected and thereafter made into polymers by heat treatment to form the organic luminescent layers. In the hole injection layers not emitting light, polyvinylcarbazole was used and was ejected by an ink jet process to the hollows 4f corresponding to blue pixels to form the hole-injection layers.

As blue luminescent layers, an aluminum quinolinol complex was further deposited in the hollows 4f by vacuum deposition to form the charge-transport-type blue luminescent layers in a thickness of 0.1 µm.

On the organic EL mediums 4h provided in the hollows 4f, silver-magnesium alloy layers 0.3 µm thick were formed as second electrodes 4i, and an aluminum layer 1 µm thick was further formed thereon as a cover electrode 4j. (See FIG. 11C.)

In the same manner as in Example 14, the face side where the partition walls 4e and the organic EL mediums 4h were formed was covered with a second substrate 4b, and the edge space between the first substrate 4a and the second substrate 4b was sealed with an adhesive 4k. Thus, the display element was made. Energizing circuits were further connected to the first electrodes 4g and the cover electrode 4j to obtain a display element.

Display was performed by applying voltage across the electrodes. The applied voltage was set at 10 V. Since the partition walls were provided on the substrate by self-assembly of the self-assembling material, highly minute display in full colors was performable without any intermixture of luminescent materials having different luminescent colors between pixels.

As described above in detail, the use of the display element of the present invention can bring about the following advantage.

In forming partition walls of display elements, the partition walls formed by self-assembly of the self-assembling material can be simply formed without relying on any conventional lithographic techniques, and hence partition walls with minute thickness can be formed with good precision. This enables simple manufacture of display elements which can perform highly minute display.

What is claimed is:

1. A display element comprising:

a pair of substrates, a display medium interposed between the substrates, and partition walls with which the display medium is divided in the direction perpendicular to the substrate faces;

wherein the display medium is provided in hollows defined by the partition walls and the substrates; and wherein the partition walls are formed of a self-assembling material which is capable of spontaneous association in solution thereby causing solidification and formation of a structural body.

2. The display element according to claim 1, which has a structure in which the hollows defined by the partition walls and the substrates are arranged in a honeycomb fashion, and the hollows each have a hollow diameter of from 10 µm to 200 µm and a partition wall height within the range of from 0.1 µm to 100 µm, having an aspect ratio within the range of from 0.1 to 100, and are arranged at intervals between hollows of from 10 µm to 210 µm.

3. The display element according to claim 1, wherein the self-assembling material comprises a block copolymer.

4. The display element according to claim 1, wherein the self-assembling material comprises a homopolymer.

5. The display element according to claim 1, wherein the self-assembling material comprises a polyion complex.

6. The display element according to claim 1, wherein the self-assembling material comprises an organic and/or inorganic hybrid material.

7. The display element according to claim 1, wherein the partition walls have a conductivity.

8. The display element according to claim 1, wherein the partition walls comprise a structural body formed by self-assembly of a conductive polymer.

9. The display element according to claim 1, wherein the display medium comprises electrophoretic particles and a dispersion medium.

10. The display element according to claim 1, wherein the display medium comprises microcapsules having enveloped the electrophoretic particles and the dispersion medium.

11. The display element according to claim 1, wherein the display medium comprises an organic EL medium.

12. A process for manufacturing a display element comprising a pair of substrates, a display medium interposed between the substrates, and partition walls with which the display medium is divided in the direction perpendicular to the substrate faces, the process comprising the steps of:

(1) forming the partition walls on one substrate by spontaneous association of a self-assembling material in a solution into a solid;

(2) filling a display medium into hollows defined by the partition walls and the substrates; and (3) covering the dispersion medium and the tops of the partition walls with the other opposing substrate, and sealing the edge space between the substrates.

13. The display element manufacturing process according to claim 12, wherein positions at which the partition walls are formed using the self-assembling material on the substrate are set on positions determined by a desired pattern of areas having different surface state.

14. The display element manufacturing process according to claim 13, wherein the desired pattern is formed of hydrophobic areas provided on the substrate.

* * * * *